United States Patent
Abe et al.

(10) Patent No.: US 7,650,032 B2
(45) Date of Patent: Jan. 19, 2010

(54) METHOD FOR ENCODING MOVING IMAGE AND METHOD FOR DECODING MOVING IMAGE

(75) Inventors: Kiyofumi Abe, Moriguchi (JP); Shinya Kadono, Nishinomiya (JP)

(73) Assignee: Panasonic Corporation, Osaka (JP)

( * ) Notice: Subject to any disclaimer, the term of this patent is extended or adjusted under 35 U.S.C. 154(b) by 759 days.

(21) Appl. No.: 10/566,506

(22) PCT Filed: Jul. 28, 2004

(86) PCT No.: PCT/JP2004/011115

§ 371 (c)(1),
(2), (4) Date: Jan. 31, 2006

(87) PCT Pub. No.: WO2005/018239

PCT Pub. Date: Feb. 24, 2005

(65) Prior Publication Data

US 2006/0285757 A1    Dec. 21, 2006

(30) Foreign Application Priority Data

Aug. 19, 2003  (JP) ............................. 2003-295007

(51) Int. Cl.
  *G06K 9/36*   (2006.01)
(52) U.S. Cl. .................... 382/166; 382/232; 382/233; 382/236
(58) Field of Classification Search ............... 382/232, 382/233, 236, 238, 239, 275, 162, 166; 375/240.27, 375/E7.135
See application file for complete search history.

(56) References Cited

U.S. PATENT DOCUMENTS

| 6,493,391 B1 | 12/2002 | Komori et al. | 375/240.25 |
| 7,095,787 B2 * | 8/2006 | Kadono et al. | 375/240.27 |
| 2004/0062310 A1 | 4/2004 | Xue et al. | 375/240.03 |
| 2004/0076237 A1 | 4/2004 | Kadono et al. | 375/240.27 |

(Continued)

FOREIGN PATENT DOCUMENTS

EP        1 296 522        3/2003

(Continued)

OTHER PUBLICATIONS

Video Coding Experts Group (VCEG). H. 26L, Test Model Long Term No. 6 (TML-6) Draft0. [online]. 2001. pp. 1, 20-22, [retrieved on Aug. 1, 2003], retrieved from the internet: <URL:http://kbs.cs.tu-berlin.de/~stewe/vceg/archive.htm#TML6>.

(Continued)

*Primary Examiner*—Anh Hong Do
(74) *Attorney, Agent, or Firm*—Wenderoth, Lind & Ponack, L.L.P.

(57) ABSTRACT

In the case where a deblocking filter applied to a luminance component is referred to and applied to a chrominance component, by converting a pixel position of the chrominance component so as to have a pixel position of a luminance component which belongs to a same field as the chrominance component (F7a) and referring to the luminance component, the present invention makes it possible to generate a more natural image by filtering the luminance component and the chrominance component with the same strength when the image is displayed in an interlaced-scan form.

14 Claims, 17 Drawing Sheets

U.S. PATENT DOCUMENTS

| | | | |
|---|---|---|---|
| 2006/0239360 A1 | 10/2006 | Kadono et al. | 375/240.27 |
| 2007/0092002 A1 | 4/2007 | Xue et al. | 375/240.16 |
| 2007/0098066 A1 | 5/2007 | Xue et al. | 375/240.29 |
| 2007/0104269 A1 | 5/2007 | Xue et al. | 375/240.29 |
| 2008/0049843 A1 | 2/2008 | Kadono et al. | 375/240.24 |
| 2008/0056353 A1 | 3/2008 | Xue et al. | 375/240.03 |
| 2008/0056602 A1 | 3/2008 | Xue et al. | 382/268 |
| 2008/0056603 A1 | 3/2008 | Xue et al. | 375/240.03 |
| 2008/0063084 A1 | 3/2008 | Xue et al. | 375/240.24 |
| 2008/0069245 A1 | 3/2008 | Kadono et al. | 375/240.24 |
| 2008/0130761 A1 | 6/2008 | Kadono et al. | 375/240.27 |

FOREIGN PATENT DOCUMENTS

| | | |
|---|---|---|
| JP | 2000-041248 | 2/2000 |
| JP | 2001-238228 | 8/2001 |
| JP | 2003-324738 | 11/2003 |
| WO | 03/047267 | 6/2003 |

OTHER PUBLICATIONS

Thomas Wiegand et al., Draft ITU-T Recommendation and Final Draft International Standard of Joint Video Specification (ITU-T Rec. H.264 | ISO/IEC 14496-10 ACV), 7$^{th}$ Meeting: Pattaya, Thailand, Mar. 7-14, 2003. pp. i-xiv and 1-250.

Supplementary European Report dated Sep. 25, 2008 issued in connection with corresponding European Application No. 04 771 166.8.

"Text of ISO/IEC FDIS 14496-10: Information Technology-Coding of audio-visual objects—Part 10: Advanced Video Coding", ISO/IEC JTC 1/SC 29/WG 11, No. N5555, Jun. 5, 2003. XP030012739.

Bjontegaard, G et al. "Adaptive deblocking filter", IEEE Transactions on Circuits and Systems for Video Technology, vol. 13, No. 7, Jul. 1, 2003. pp. 614-619, XP011099254, ISSN: 1051-8215.

* cited by examiner

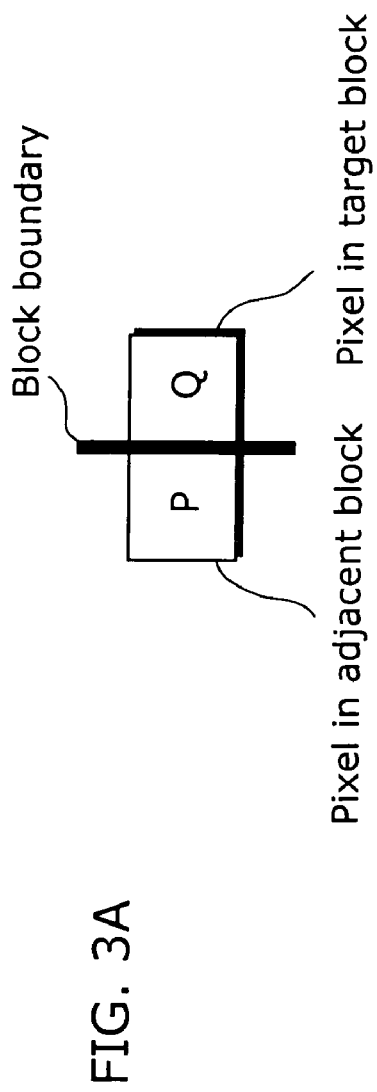

| Filter 4 | In the case where a boundary is at vertical edge and either P or Q belongs to block which is intra prediction encoded. |
| --- | --- |
| Filter 3 | In the case where a boundary is at horizontal edge and either P or Q belongs to a block which is intra prediction encoded. |
| Filter 2 | In the case where either P or Q belongs to a block having coefficient other than 0. |
| Filter 1 | In the case where P and Q belong to a block which is inter prediction encoded and refer to respective pictures, or refer using respective motion vectors. |
| Filter 0 | Other than the above. |

FIG. 5A
Half decimation in horizontal and vertical directions

× × × × ×
× ○ × × ○ × × ○
× × × × ×
× ○ × × ○ × × ○
× × × × ×
× ○ × × ○ × × ○

FIG. 5B
Half decimation in horizontal direction

× × × × ×
⊗ ⊗ ⊗ ⊗ ⊗
× × × × ×
⊗ ⊗ ⊗ ⊗ ⊗
× × × × ×
⊗ ⊗ ⊗ ⊗ ⊗

FIG. 5C
No decimation

⊗ ⊗ ⊗ ⊗ ⊗
⊗ ⊗ ⊗ ⊗ ⊗
⊗ ⊗ ⊗ ⊗ ⊗
⊗ ⊗ ⊗ ⊗ ⊗
⊗ ⊗ ⊗ ⊗ ⊗
⊗ ⊗ ⊗ ⊗ ⊗

× : Luminance component sample position

○ : Chrominance component sample position

FIG. 6A Frame

FIG. 6B Field — Top field / Bottom field

× : Luminance component sample position
○ : Chrominance component sample position FIG. 7A
Frame FIG. 7B
Field

FIG. 9A Frame

FIG. 9B Field

Top field

Bottom field

× : Luminance component sample position

○ : Chrominance component sample position

FIG. 11A  Frame

FIG. 11B  Field

Top field    Bottom field

× : Luminance component sample position
○ : Chrominance component sample position

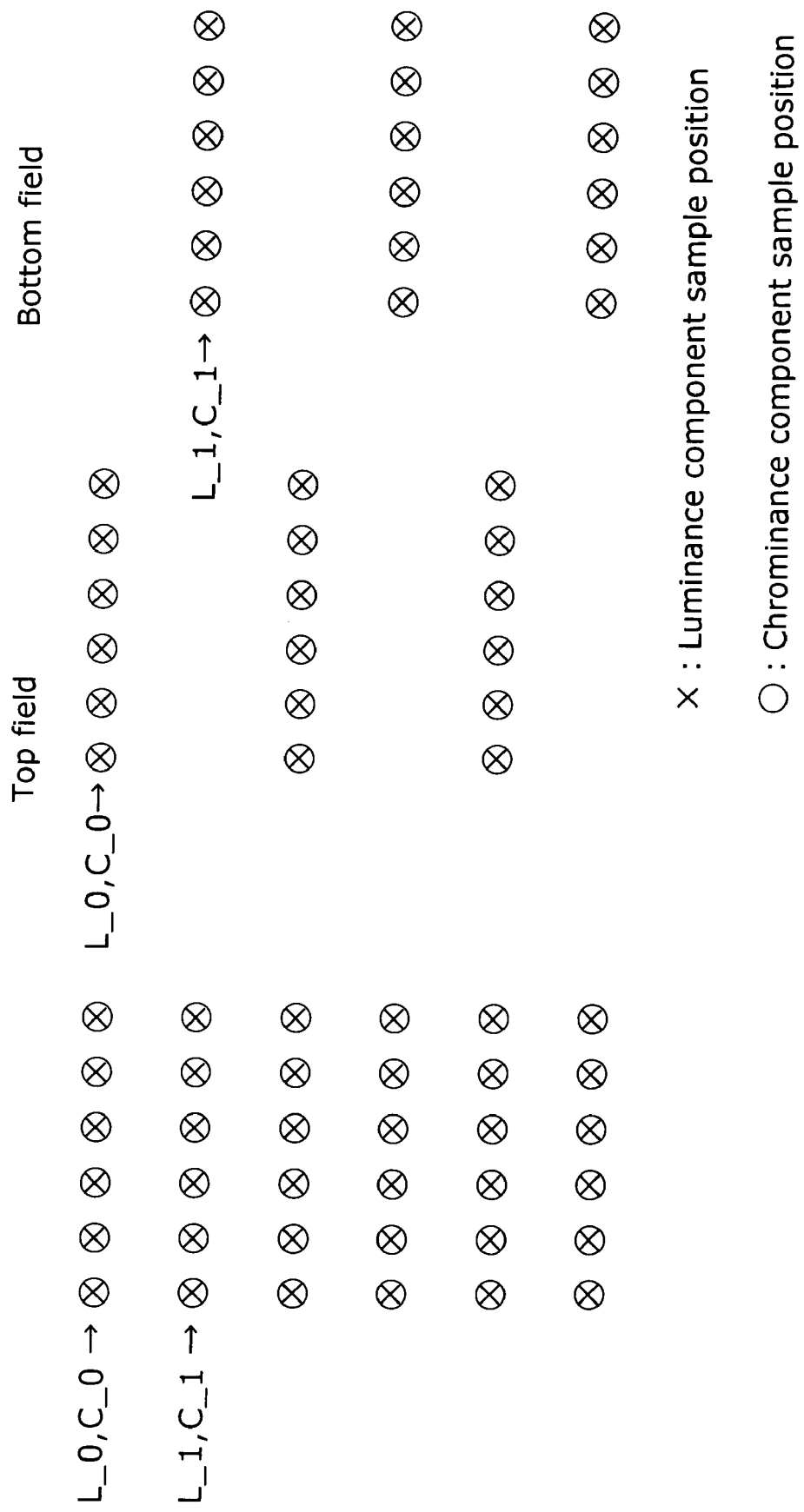

METHOD FOR ENCODING MOVING IMAGE AND METHOD FOR DECODING MOVING IMAGE

TECHNICAL FIELD

This invention relates to a moving image encoding method for encoding a moving image signal after dividing the moving image signal composed of luminance components and chrominance components into blocks, and to a moving image decoding method for decoding the encoded data.

BACKGROUND ART

In the age of multimedia which integrally handles audio, video and other pixel values, existing information media, specifically, newspaper, magazine, television, radio, telephone and the like through which information is conveyed to people, have recently come to be included in the scope of multimedia. Generally, multimedia refers to something that is represented by associating not only characters, but also graphics, sound, and especially images and the like, together, but in order to include the aforementioned existing information media in the scope of multimedia, it becomes a prerequisite to represent such information in a digital form.

However, if the amount of information carried by each of the mentioned information media is estimated as the amount of digital information, while the amount of information for 1 character in the case of text is 1 to 2 bytes, the amount of information required for sound is 64 Kbits per second (telephone quality), and 100 Mbits or over per second becomes necessary for moving images (current television receiving quality), it is not realistic for the information media to handle such an enormous amount of information as it is in digital form. For example, although video phones are already in actual use via Integrated Services Digital Network (ISDN) which offers a transmission speed of 64 kbps to 1.5 Mbps, it is impossible to transmit images on televisions and images taken by cameras directly through ISDN.

Accordingly, information compression techniques have become required, and for example, in the case of the video phone, the H.261 and H.263 standards for moving image compression technology, internationally standardized by the International Telecommunication Union—Telecommunication Standardization Sector (ITU-T), are being employed. Moreover, with MPEG-1 standard information compression techniques, it has also become possible to store video information onto general music compact discs (CD) together with audio information.

Here, a Moving Picture Experts Group (MPEG) is an international standard for a moving image signal digital compression. The MPEG-1 is a standard for compressing moving image signals up to 1.5 Mbps, in other words, compressing television signals up to approximately a hundredth of the original size. Moreover, since target picture quality within the scope of the MPEG-1 standard is limited to a medium degree of quality which can be realized by a transmission speed of primarily about 1.5 Mbps, the use of MPEG-2, which was standardized to satisfy demands for further improved picture quality, realizes television broadcasting quality with moving image signals compressed to 2 to 15 Mbps.

Furthermore, a MPEG-4 having a higher compression ratio has been standardized by a working group (ISO/IEC JTC1/SC29/WG11) which has pursued standardizations of MPEG-1 and MPEG-2. The MPEG-4 not only enables an efficient coding with a low bit rate, but also introduces a strong error tolerance technique which can reduce subjective picture quality degradation even when a transmission line error has occurred. In addition, currently, as a next generation screen coding method, a standardization of H.264 has been pursued by a cooperation of ISO/IEC with ITU-T.

In general, in encoding of a moving image, the amount of information is compressed by reducing redundancy in temporal and spatial directions. Here, in an inter prediction encoding for reducing temporal redundancy, a motion estimation and a generation of a prediction image are performed on a block-by-block basis by referring to preceding and following images, and encoding is performed on a difference between the obtained prediction image and a block to be encoded. Further, in an inter prediction encoding for reducing spatial redundancy, a prediction image is generated from pixel information of a neighboring encoded block, and the encoding is performed on a difference between the obtained prediction image and the block to be encoded.

Here, a picture is a language indicating one screen. It indicates one frame when coded as a frame structure. Also, it indicates one field when coded as a field structure.

Each picture is divided into blocks called micro blocks, for example, each of which is horizontal 16×vertical 16 pixels, and is processed on a block-by-block basis. The picture of the field structure is encoded by including all micro blocks as a field macro block. On the other hand, the picture of the frame structure can be encoded not only by using all micro blocks as a frame macro block, but also by switching to a frame or a field on a basis of vertically sequential two macro blocks as one unit (a macro block pair).

FIG. 1 is a block diagram showing a structure of a moving image encoding apparatus which realizes a conventional moving image encoding method. The moving image encoding apparatus includes a picture memory 101, a prediction residual encoding unit 102, a bit stream generation unit 103, a prediction residual decoding unit 104, a deblocking unit 105, a picture memory 106, an encoding mode controlling unit 107, an inter prediction image generation unit 108 and an intra prediction image generation unit 109.

In a displaying order of the bit stream to be encoded, the bit stream is inputted to the picture memory 101 on a picture-by-picture basis, and the pictures are sorted in an encoding order. Further, each of the pictures is divided into macro blocks and the following processing is applied on each micro block.

There are mainly two types of encoding methods: an inter prediction encoding; and an intra prediction encoding. Here, it is explained first about the inter prediction encoding.

An input image signal read out from the picture memory 101 is inputted to a difference arithmetic unit 110, and a difference image signal obtained by calculating a difference with the prediction image signal that is an output of the inter prediction image generation unit 108 is outputted to the prediction residual encoding unit 102. The prediction residual encoding unit 102 performs image encoding processing such as frequency conversion and quantization so as to output a residual signal. The residual signal is inputted to the prediction residual decoding unit 104, and an image decoding processing such as inverse quantization and inverse frequency conversion is performed so as to output a residual decoded signal. A sum arithmetic unit 111 adds the residual decoded signal and the prediction image signal so as to generate a reconstructed image signal. The reconstructed image signal is processed for reducing distortion which occurs in a boundary between blocks that are divided when encoding is performed by the deblocking processing unit 105, before being stored as a reference picture into the picture memory 106.

On the other hand, the input image signal on a macro block-by-block basis read out from the picture memory 101 is also inputted to the inter prediction image generation unit 108. Here, targeting one picture stored in the picture memory 106 or encoded pictures, an image area which is closest to the input image signal is detected and outputted as a prediction image. The prediction image is used for generating a difference image signal in the difference arithmetic unit 110 and for generating a reconstructed image signal in the sum arithmetic unit 111.

The bit stream generation unit 103 performs variable length encoding on various encoded information outputted by the series of above processing so as to obtain a bit stream (moving image encoded data) to be outputted by the encoding processing.

While this flow of processing is an operation in the case where the inter prediction encoding is performed, it is switched to the intra prediction encoding by the switch 112. Hereafter, it is explained about the intra prediction encoding.

The input image signal read out from the picture memory 101 is inputted to the difference arithmetic unit 110, and the difference image signal obtained by calculating a difference with the prediction image signal that is an output of the intra prediction image generation unit 109 is outputted to the prediction residual encoding unit 102. The prediction residual encoding unit 102 performs image encoding processing such as frequency conversion and quantization so as to output a residual signal. The residual signal is inputted to the prediction residual decoding unit 104, and the image decoding processing such as inverse conversion and inverse frequency conversion is performed so as to output the residual decoded signal. The sum arithmetic unit 111 adds the residual decoded signal and the prediction image signal, and generates a reconstructed image signal. The reconstructed image signal is processed for reducing distortion which occurs in a boundary between blocks that are divided when the deblocking processing unit 104 performs encoding.

On the other hand, the input image signal read out from the picture memory 101 on a macro block-by-block basis is also inputted to the intra prediction image generation unit 109. Here, a prediction image is generated by referring to the reconstructed image signal of one or more neighboring blocks in the same picture generated as an output of the sum arithmetic unit 111. The prediction image is used for generating a difference image signal in the difference arithmetic unit 110 and for generating a reconstructed image signal in the sum arithmetic unit 111.

The bit stream generation unit 103 performs variable length encoding on various encoded information outputted by the series of processing so that a bit stream outputted by the encoding processing is obtained.

Each encoding mode of the inter prediction encoding and the intra prediction encoding is controlled by the encoding mode control unit 107 and switched on a macro block-by-block basis.

FIG. 2 is a block diagram showing a structure of a moving image decoding apparatus which realizes a conventional moving image decoding method. The moving image decoding apparatus includes a bit stream analyzing unit 201, a prediction residual decoding unit 202, a deblocking unit 203, a picture memory 204, a decoding mode controlling unit 205, an inter prediction image generation unit 206 and an intra prediction image generation unit 207.

First, the bit stream analyzing unit 201 extracts various information from the inputted bit stream (moving image encoded data), and the information relating to a decoding mode and the residual coded signal are respectively outputted to the decoding mode controlling unit 205 and the prediction residual decoding unit 202.

There are two types of decoding methods: an inter prediction decoding; and an intra prediction decoding. Here, it is explained first about an inter prediction decoding.

The prediction residual decoding unit 202 performs image decoding processing such as inverse quantization and inverse frequency conversion on the inputted residual encoded signal, and outputs the residual decoded signal. The sum arithmetic unit 208 adds the residual decoded signal and the prediction image signal outputted from the inter prediction image generation unit 206, and generates a decoded image signal. The deblocking unit 203 performs processing for reducing distortion which occurs in a boundary between blocks on the decoded image signal before being stored into the picture memory 204 as a picture for reference or display.

On the other hand, the inter prediction image generation unit 206 takes out a specified image area from one or more decoded pictures stored in the picture memory 204, and generates a prediction image. The prediction image is used for generating a decoded image signal by the sum arithmetic unit 208.

The decoded image generated by the series of processing is outputted as an image signal for display from the picture memory 204 according to the timing to be displayed.

While the flow of processing is an operation in the case where the inter prediction decoding is performed, it is switched to the intra prediction decoding by the switch 209. Hereafter, it is explained about the intra prediction encoding.

The prediction residual decoding unit 202 performs image decoding processing such as inverse quantization and inverse frequency conversion on the inputted residual encoded signal, and outputs a residual decoded signal. The sum arithmetic unit 208 adds the residual decoded signal and the prediction image signal outputted from the intra prediction image generation unit 207, and generates a decoded image signal. The deblocking processing unit 203 performs processing for reducing distortion which occurs in a boundary between blocks on the decoded image signal before being stored in the picture memory 204 as a picture for display.

On the other hand, the intra prediction image generation unit 207 generates a prediction image by referring to a decoded image signal of one or more neighboring blocks in the same picture generated as an output of the sum arithmetic unit 208. The prediction image is used for generating the decoded image signal in the sum arithmetic unit 208.

The decoded image generated by the series of processing is outputted as an image signal for display from the picture memory 204 according to the timing to be displayed.

Note that, each of the decoding modes of the inter prediction decoding and the intra prediction decoding is controlled by the decoding mode controlling unit 205 and switched on a macro block-by-block basis.

Next, it is explained in detail about processing in the deblocking units 105 and 203. Here, the processing details in the encoding processing and the processing details in the decoding processing are precisely identical to each other. Therefore, they are explained together as the same processing.

FIGS. 3A and 3B are drawings for explaining a method of determining types of filters used for deblocking. Here, as an example, assuming that there are five types of filters, the filters are used by being switched according to a characteristic of a block boundary. It is structured to apply a stronger filter (here indicates Filter 4) to a portion where has a higher possibility in which block distortion eminently occurs, and a weaker filter (here indicates Filter 0) to a portion where has a lower possibility in which block distortion eminently occurs.

FIG. 3A is a drawing showing a boundary between blocks to which filters are applied. In the drawing, the center line indicates a boundary between blocks; a pixel on the right side shown as Q indicates a pixel adjacent to the boundary in the target block; and the pixel on the left side shown as P indicates a pixel adjacent to the boundary in the adjacent block. FIG. 3B is a table showing which filters are selected with which conditions the pixel P and the pixel Q shown in FIG. 3B have. For example, the Filter 4 is selected in the case where the boundary is at a vertical edge and one of the pixels P and Q belongs to a block which is intra prediction encoded. Similarly, the Filter 3 is selected in the case where the boundary is at a horizontal edge and one of the pixels P and Q belongs to a block which is intra prediction encoded. Also, the Filter 2 is selected in the case where one of the pixels P and Q belongs to a block which has a coefficient other than 0 of a spatial frequency component converted by frequency conversion. Further, the Filter 1 is selected in the case where the pixels P and Q belong to a block which is inter prediction encoded and refer to respectively different pictures or different motion vectors. Furthermore, the Filter 0 is selected in the case where it is not applied to any of the above conditions.

Here, the table of FIG. 3B shows an example of a method of selecting filters. The number of filters and the selection conditions are not limited to the example. Therefore, the other cases can be similarly treated.

Next, a flow of deblocking processing is explained with reference to a flowchart shown in FIG. 4. The target data is managed in separated forms of data for luminance and data of chrominance. Therefore, deblocking is separately applied to each component.

First, in order to perform deblocking on luminance components, a loop processing is repeated as many as the number of pixels of the luminance component adjacent to a target block boundary (F1 and F4); a type of filter explained with reference to FIG. 3 is selected in each loop (F2); and the filter is applied (F3). The information of the type of the selected filter herein is stored in the memory region in which the information can be seen in later processing, while being used for applying filtering on the target pixel of the luminance component (F5). In order to target, for each pixel, a boundary which is at a vertical edge on the left side and a boundary which is a horizontal edge on the upper side, the above mentioned processing is applied eight times in the case of a block which is, for example, made up of horizontal 4×vertical 4 pixels.

Next, in order to perform deblocking on chrominance components, a loop processing is turned as many as the number of pixels of the chrominance components adjacent to the target block boundary (F6 and F10); a type of filter is selected in each loop (F8); and the selected filter is applied (F9). Herein, a filter to be applied is determined according to the type of the filter used for the luminance component. Specifically, the type of the filter applied at a position of a pixel of the corresponding luminance component is referred to and used from the memory region in which the information about the type of filter determined in the processing for the luminance component is stored. Here, the following equations are used for converting the position of a target pixel of the chrominance component to a position of a corresponding pixel of the luminance component (F7). Note that, XL indicates a horizontal coordinate value of the luminance, XC indicates a horizontal coordinate value of the chrominance, YL indicates a vertical coordinate value of the luminance, and YC indicates a vertical coordinate value of the chrominance.

$$XL = 2 \times XC \quad \text{(equation 1(a))}$$

$$YL = 2 \times YC \quad \text{(equation 1(b))}$$

Thus, deblocking is performed on the chrominance component by applying a filter determined by the above mentioned processing.

Next, it is explained about a relationship between the luminance components and the chrominance components. FIGS. 5A-5C are drawings for explaining positional relationships between the luminance components and the chrominance components. In the drawings, x mark indicates a sample position of the luminance component and O mark indicates a sample position of the chrominance component.

In general, eyes of humans are insensitive to changes of the chrominance components. Therefore, it is more likely that the color components are decimated for use. While there are various decimation methods, FIG. 5A indicates a positional relationship in the case where the chrominance components are decimated to a half amount in both vertical and horizontal directions. FIG. 5B indicates a positional relationship in the case where chrominance components are decimated to a half amount only in a horizontal direction. FIG. 5C indicates a positional relationship in the case where decimation is not performed. In the case of the positional relationship as shown in FIG. 5A, the equation 1(a) and the equation 1(b) are used for calculating a pixel position of the corresponding luminance component for deblocking the chrominance component.

Further, FIGS. 6A-6C show a positional relationship in a frame structure and in a field structure in the case where the chrominance components are decimated to a half amount in both vertical and horizontal directions. FIG. 6A shows a frame structure when processing is performed after decimating the chrominance components. FIG. 6B shows a field structure which is replaced to the frame structure. Specifically, zeroth, second and fourth lines of the luminance components are assigned to a top field and first, third, and fifth lines are assigned to a bottom field. (Refer to: ITU-T Rec. H.264|ISO/IEC 14496-10 AVC Draft Text of Final Draft International Standard (FDIS) of Joint Video Specification (2003-3-31)).

However, in the conventional structure, the type of a filter used for the luminance component at a pixel position converted using the equation 1(a) and the equation 1(b) is applied to a pixel of the chrominance component. Therefore, there was a problem of causing inconsistency that a filter to be applied to the chrominance component is determined by referring to the luminance component in the top field, in the case where an image to be displayed in an interlaced-scan form is encoded and decoded in the frame structure. FIGS. 7A and 7B are drawings for explaining the reference relationship therein. FIG. 7A shows a positional relationship between the luminance components and the chrominance components when the picture is encoded and decoded in the frame structure. FIG. 7B shows a positional relationship between the luminance components and the chrominance components when the image is replaced to the field structure. Here, L_0 indicates a position of the luminance components at zeroth line, and C_0 indicates a position of the chrominance components at zeroth line. It is indicated that the luminance component at L_2 is referred by the equation 1(b) when a deblocking filter is applied to the color component of C_1. However, when the pixel is replaced to the field structure, it is found that a type of filter is determined by which the chrominance at C_1 in the bottom field refers to the luminance component at L_2 in the top field.

As described above, in the picture having the frame structure, all macro blocks can be encoded not only as frame macro blocks but also by switching to the frame structure or the field structure on a macro block pair-by-pair basis. Also, in the case where the picture is encoded in the field structure, it is possible to use respective encoding modes for the top field and the bottom field.

Accordingly, for example, in the case where an intra prediction encoding mode is used in the top field and an inter prediction encoding mode is used in the bottom field, picture quality is degraded in the chrominance components in the bottom field. In other words, basically, a strong filter is adapted for the intra prediction encoding mode and a weak filter is adapted for the inter prediction encoding mode. Therefore, an originally weak filter should be applied to the chrominance components in the bottom field. However, as described in the above, a type of filter for the chrominance components in the bottom field is determined by referring to the luminance components in the top field. Therefore, a strong filter is adapted. Consequently, the picture quality is degraded in the chrominance components in the bottom field so that the image is not consistent when it is displayed in the interlaced-scan form.

Further, the same thing is also applied to the case where, even if a same encoding mode is used for the top field and the bottom field of the target macro block, an adjacent macro block is encoded in the field structure and respective encoding modes are used for the top field and the bottom field.

As described in the above, in the case where the image to be displayed in the interlaced-scan form is encoded and decoded in the frame structure, there is a problem that an inappropriate type of filter is applied because there is a case where the type of filter applied to the chrominance components is determined by referring to the luminance components in a different field.

DISCLOSURE OF INVENTION

In order to solve the conventional problems, it is an object of the present invention to provide a moving image encoding method and a moving image decoding method for enabling to apply a most appropriate type of filter for deblocking even in the case where a image to be displayed in an interlaced-scan form is encoded and decoded.

In order to achieve the aforementioned object, a moving image encoding method according to the present invention is a moving image encoding method for encoding an inputted picture on a block-by-block basis after dividing the picture into blocks, the picture including luminance components and chrominance components, the method including: a prediction encoding step of encoding the picture by referring to an encoded area in the picture or a different encoded picture; a reconstructed picture generation step of reconstructing the picture using encoded data generated in the prediction encoding step; and a deblocking step of reducing distortion by filtering a boundary between blocks of the reconstructed picture generated in the reconstructed picture generation step, wherein in the deblocking step, filters are respectively applied to the luminance components and the chrominance components: a type of the filters is selected based on encoding information of each luminance component and the selected filter is applied to the luminance component; and a filter selected for a luminance component, which belongs to a same field as a chrominance component and corresponds to the chrominance component, is applied to the chrominance component.

Accordingly, the same type of deblocking filter is applied to the luminance components and chrominance components in the same field. Therefore, an encoding so as to generate a consistent image when the image is displayed in the interlaced-scan form after the image is decoded. Further, it is possible to combine a structure of the present invention easily into the conventional structure because there are very few changes from the conventional structure.

Also, a moving image decoding method according to the present invention is a moving image decoding method for decoding encoded moving image data obtained by encoding, on a block-by-block basis, a picture which is divided into blocks, the picture including luminance components and chrominance components, the method including: a prediction decoding step of decoding the picture by referring to a decoded area in the picture or a different decoded picture; and a deblocking step of reducing distortion by filtering a boundary between blocks of the decoded picture generated in said prediction decoding step, wherein in the deblocking step, filters are respectively applied to the luminance components and the chrominance components: a type of the filters is selected based on encoding information of the luminance component and the selected filter is applied to each luminance component; and a filter selected for a luminance component, which belongs to a same field as a chrominance component and corresponds to the chrominance component, is applied to the chrominance component.

Accordingly, a same type of deblocking filter is applied to the luminance components and chrominance components in the same field. Further, it is possible to combine a structure of the present invention easily into the conventional structure because there are very few changes from the conventional structure.

Note that, the present invention is not only realized as such moving image encoding method and the moving image decoding method, but also as a moving image encoding apparatus and a moving image decoding apparatus having characteristic steps included in the moving image encoding method and the moving image decoding method as units. Further, it can be realized as a program for causing a computer to execute those steps and as moving image data encoded by the moving image encoding method. Furthermore, such program and the encoded moving image data can be distributed via a recording medium such as a CD-ROM and a transmission medium such as the Internet.

According to the moving image encoding method by the present invention, same type of deblocking filter is applied to the luminance components and the chrominance components in the same field. Therefore, it is possible to perform encoding so as to generate a consistent image when the image is displayed in the interlaced-scan form after the image is decoded. Further, it is possible to combine a structure of the present invention easily into the conventional structure because there are few changes from the conventional structure.

In addition, according to the moving image decoding method by the present invention, a same type of deblocking filter is applied to the luminance components and chrominance components in the same field. Therefore, it is possible to generate a consistent image in the case of displaying the image in the interlaced-scan form. Further, it is possible to combine a structure of the present invention easily into the conventional structure because there are very few changes from the conventional structure.

BRIEF DESCRIPTION OF DRAWINGS

FIGS. 3A and 3B are schematic drawings showing a method of determining types of deblocking filters.

FIGS. 5A-5C are schematic drawings showing a relationship of sample positions of chrominance components and luminance components.

FIGS. 6A and 6B are other schematic drawings showing a relationship of sample positions of chrominance components and luminance components.

FIGS. 7A and 7B are schematic drawings showing a relationship when the pixel positions of the chrominance components are converted to the pixel positions of the luminance components.

FIGS. 9A and 9B are other schematic drawings showing a relationship when the pixel positions of the chrominance components are converted to the pixel positions of the luminance components.

FIGS. 11A and 11B are other schematic drawings showing a relationship when the pixel positions of the chrominance components are converted to the pixel positions of the luminance components.

FIGS. 12A and 12B are other schematic drawings showing a relationship when the pixel positions of the chrominance components are converted to the pixel positions of the luminance positions.

FIG. 13A is an illustration showing an example of a physical format of a flexible disc which is a recording medium body; FIG. 13B is an illustration showing an outer view seen from the front of the flexible disc, a cross-section structure, and flexible disc; and FIG. 13C is an illustration showing a structure for recording and reproducing the program on the flexible disc FD.

BEST MODE FOR CARRYING OUT THE INVENTION

Hereafter, it is explained about specific embodiments of the present invention with references to the drawings.

First Embodiment

Figure 1:
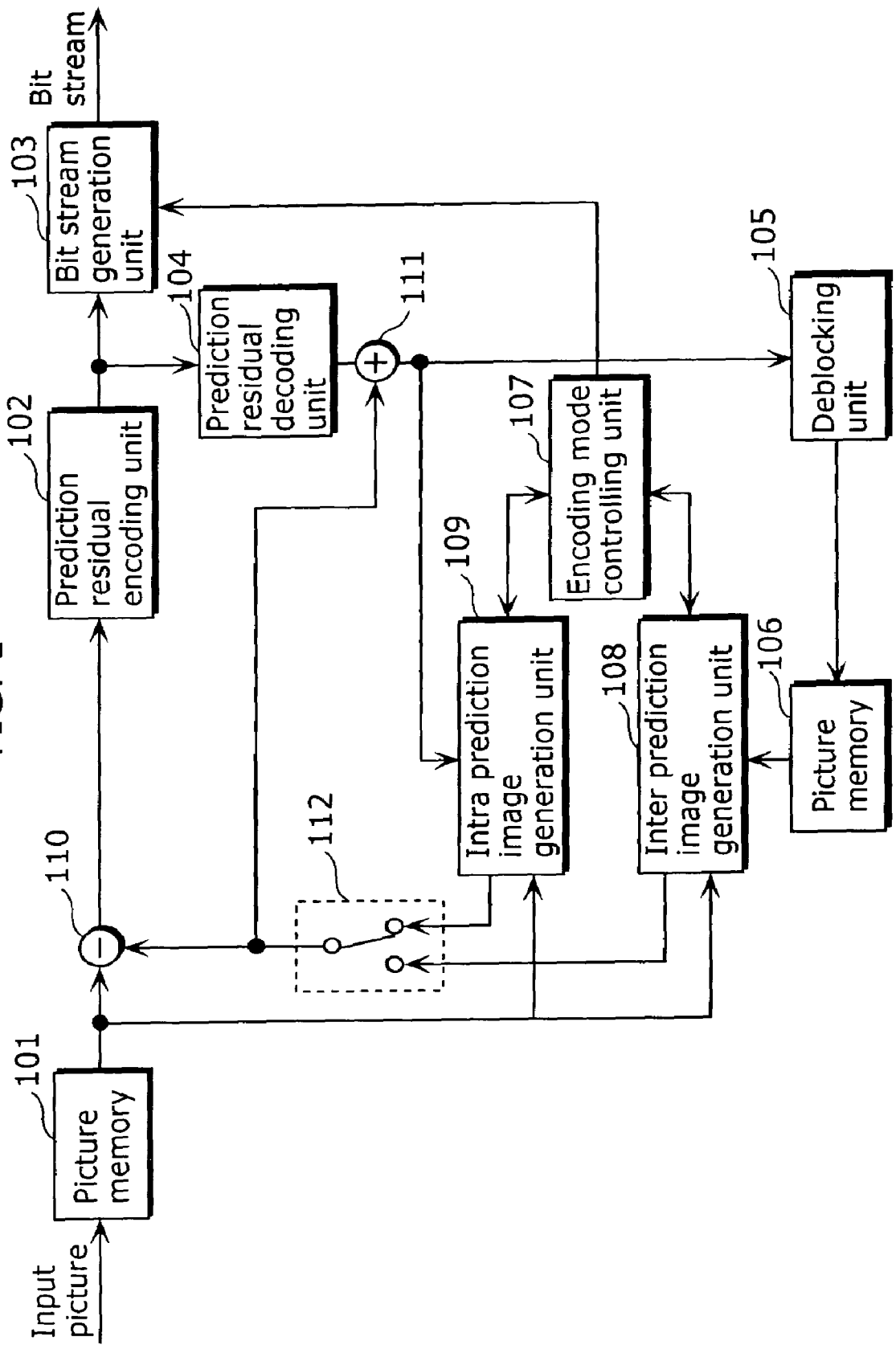
FIG. 1 is a block diagram showing a structure of a conventional moving image encoding apparatus.

The structure of a moving image encoding apparatus according to a flow of encoding processing as a whole in a first embodiment of the present invention is completely the same as the conventional structure explained using FIG. 1. Therefore, an explanation about the same structure is omitted in here. The structure of the moving image encoding apparatus only differs from the conventional structure in a deblocking method used by the deblocking unit 105 shown in FIG. 1. Also, the structure of the moving image decoding apparatus according to a flow of decoding processing as a whole is completely the same as the conventional structure explained using FIG. 2. Therefore, the explanation is omitted in here. It differs from the conventional structure only in a deblocking method used by a deblocking unit 203 shown in FIG. 2.

Hereafter, it is explained in detail about the processing in the deblocking units 105 and 203. Here, the processing details in the encoding processing and in the decoding processing are completely the same so that they are explained together.

The deblocking processing differs depending on a method of decimating chrominance components in the structure of the moving image data. Here, three types of decimation methods are respectively explained: (1) it is explained about the case where, as shown in FIG. 5A, the moving image data in which the chrominance components are decimated to a half amount in both vertical and horizontal directions is inputted; (2) it is explained about a case where, as shown in FIG. 5B, the moving image data in which the chrominance components are decimated to a half amount only in the horizontal direction is inputted; and (3) it is explained about a case, as shown in FIG. 5C, where the moving image data in which the chrominance components are not decimated is inputted. Note that, in the following explanation, it is assumed that a target block is encoded and decoded as a frame structure.

(1) Half Decimation in Vertical and Horizontal Directions

Figure 8:
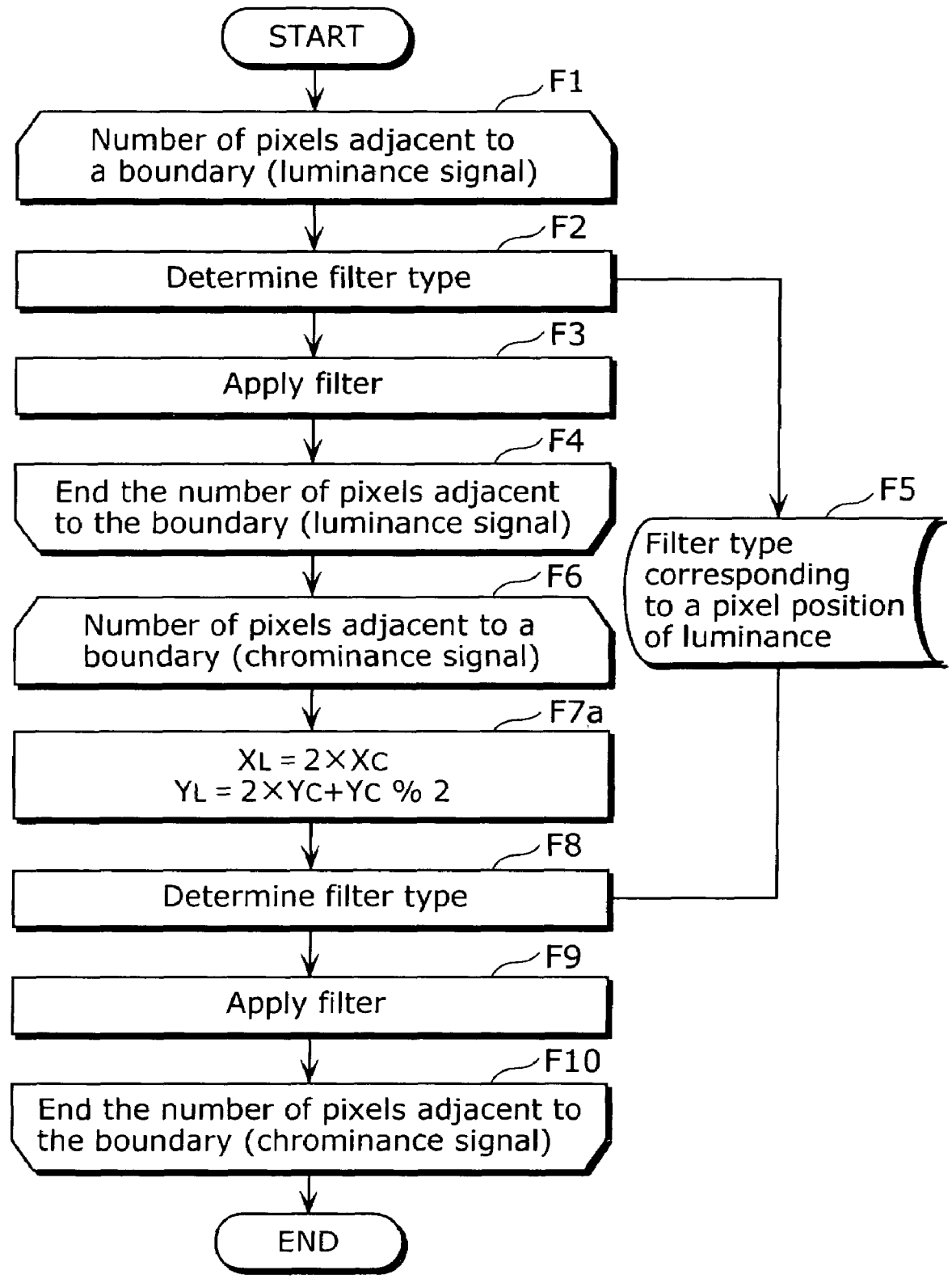
FIG. 8 is a flowchart for explaining a flow of deblocking processing in the moving image encoding apparatus and the moving image decoding apparatus in a first embodiment.

FIG. 8 is a flowchart for explaining a flow of deblocking processes in the case where the moving image in which the chrominance components are decimated to a half amount in both vertical and horizontal directions is inputted. The target moving image data is managed by being divided into luminance components and chrominance components. Therefore, deblocking is independently performed on the respective components.

First, in order to perform deblocking on the luminance components, a loop processing is repeated as many times as the number of pixels of the luminance components adjacent to the target block boundary (F1 and F4), a type of filter is selected using encoding information of a pixel of a target luminance component in each loop (F2), and the selected filter is applied (F3). The information about the type of filter selected herein is stored in a memory region in which the information can be referred in latter processing, while being used for applying filtering to the pixel of the target luminance component (F5). Since a boundary formed of a left vertical edge and a boundary formed of an upper horizontal edge are targets for each block, the processing is repeated eight times in the case of a block, for example, made up of horizontal 4×vertical 4 pixels.

It is explained about a method for determining types of filters with reference to FIG. 3. Here, assuming that there are five types of filters as an example, the filters are used by switching them depending on a characteristic of a block boundary. It is structured that a stronger filter (here indicated as Filter 4) is applied to a portion where there is a higher possibility that block distortion is eminently generated and that a weaker filter (here indicated as Filter 0) is applied to a portion where there is a lower possibility that block distortion is eminently generated.

FIG. 3A is a drawing showing a boundary between blocks to which filters are applied. In the drawing, a center line indicates a boundary between blocks, a pixel on the right side shown as Q indicates a pixel adjacent to the boundary in a target block, and a pixel on the left side shown as P indicates a pixel adjacent to the boundary in an adjacent block. FIG. 3B is a table showing which filters are selected for which conditions the pixel P and the pixel Q shown in FIG. 3A have. For example, the Filter 4 is selected in the case where the boundary is at the vertical edge and one of the pixel P and the pixel Q belongs to a block which is intra prediction encoded.

Note that, the table of FIG. 3B only shows an example of a method of selecting filters and the number of filters and the selection conditions are not limited to the example. Therefore, other cases can be similarly treated.

The information about the type of filter determined by the mentioned processing is used for applying filtering on the target pixel of the luminance component, while being stored in the memory region in which the information can be referred to in latter processing.

Next, in order to perform deblocking on the chrominance components, a loop processing is repeated as many times as the number of pixels of the chrominance components adjacent to the target block boundary (F6 and F10); a type of filter is selected in each loop (F8); and the selected filter is applied (F9). Herein, a filter to be applied to the chrominance component is determined based on the type of filter used for the luminance component. Specifically, the type of filter applied at a pixel position of the corresponding luminance component is referred and used from the memory region in which the information about the type of filter determined in the processing for the luminance component is stored. Herein, the pixel position of the target chrominance component is converted to the pixel position of the corresponding luminance component (F7a).

The conversion of information about the position of a pixel is performed so as to have the position of the pixel of the luminance component assigned to a same field as a target pixel of the chrominance component when the target block is replaced to the filed structure. Here, since the chrominance components are decimated to the half amount in both vertical and horizontal directions, the conversion is performed using the following equations. Note that, it is assumed that marks indicate the following: XL indicates a horizontal coordinate value of the luminance; XC indicates a horizontal coordinate value of the chrominance; YL indicates a vertical coordinate value of the luminance; and YC indicates a vertical coordinate value of the chrominance. Further, the mark % in the equation 2(b) indicates an operator which operates to add a remainder when division is performed.

$$XL = 2 \times XC \quad \text{(equation 2(a))}$$

$$YL = 2 \times YC + YC \, \% \, 2 \quad \text{(equation 2(b))}$$

By applying the filter determined by the mentioned processes, deblocking is performed on the chrominance components. Since a boundary formed of a left vertical edge and a boundary formed of an upper horizontal edge are targeted for each block, for example, in the case where the luminance components form a block made up with horizontal 4×vertical 4 pixels, here explains as an example of decimating the chrominance components to the half amount in both vertical and horizontal directions so that the mentioned processing is repeated four times to make the chrominance components to have horizontal 2×vertical 2 pixels.

Figures 9A, 9B:
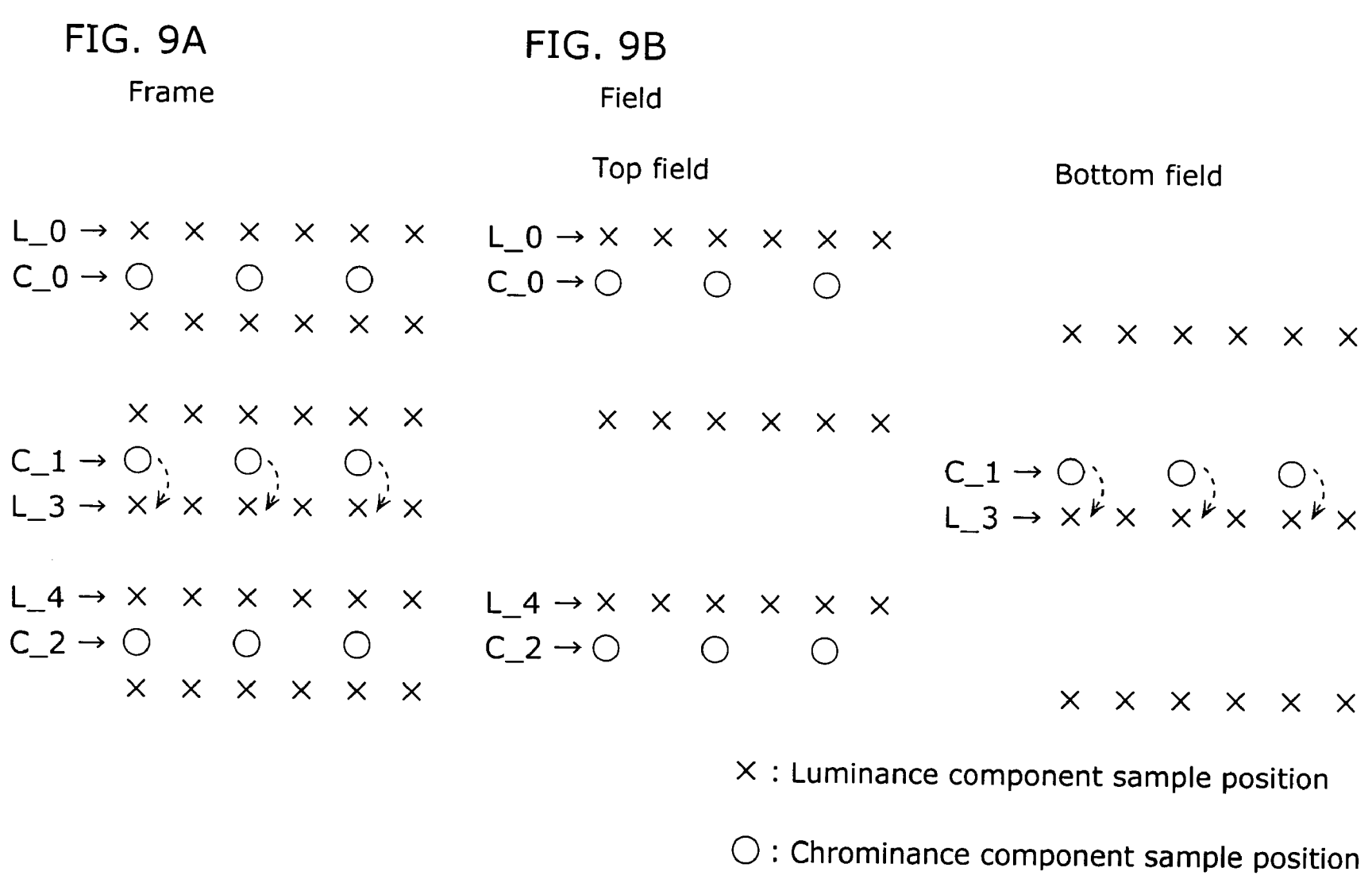

FIGS. 9A and 9B are drawings for explaining a relationship between positions of pixels of target chrominance components and positions of pixels of reference luminance components that are converted using the equations 2(a) and 2(b). FIG. 9A shows a positional relationship between the luminance components and the chrominance components in the frame structure. FIG. 9B shows a positional relationship between the luminance components and the chrominance components in the case where the image is replaced to the field structure. Here, L_0 indicates a position of a luminance component at zeroth line and C_0 indicates a position of a chrominance component at zeroth line. In the case where a deblocking filter is applied to the chrominance components of C_1, it is indicated that the luminance components of L_3 are referred using the equation 2(b). Replacing the pixels herein to the field structure, it is found that the chrominance components of C_1 in the bottom field refer to the luminance components of L_3 in the same bottom field so as to determine a type of filter.

Figures 7A, 7B:
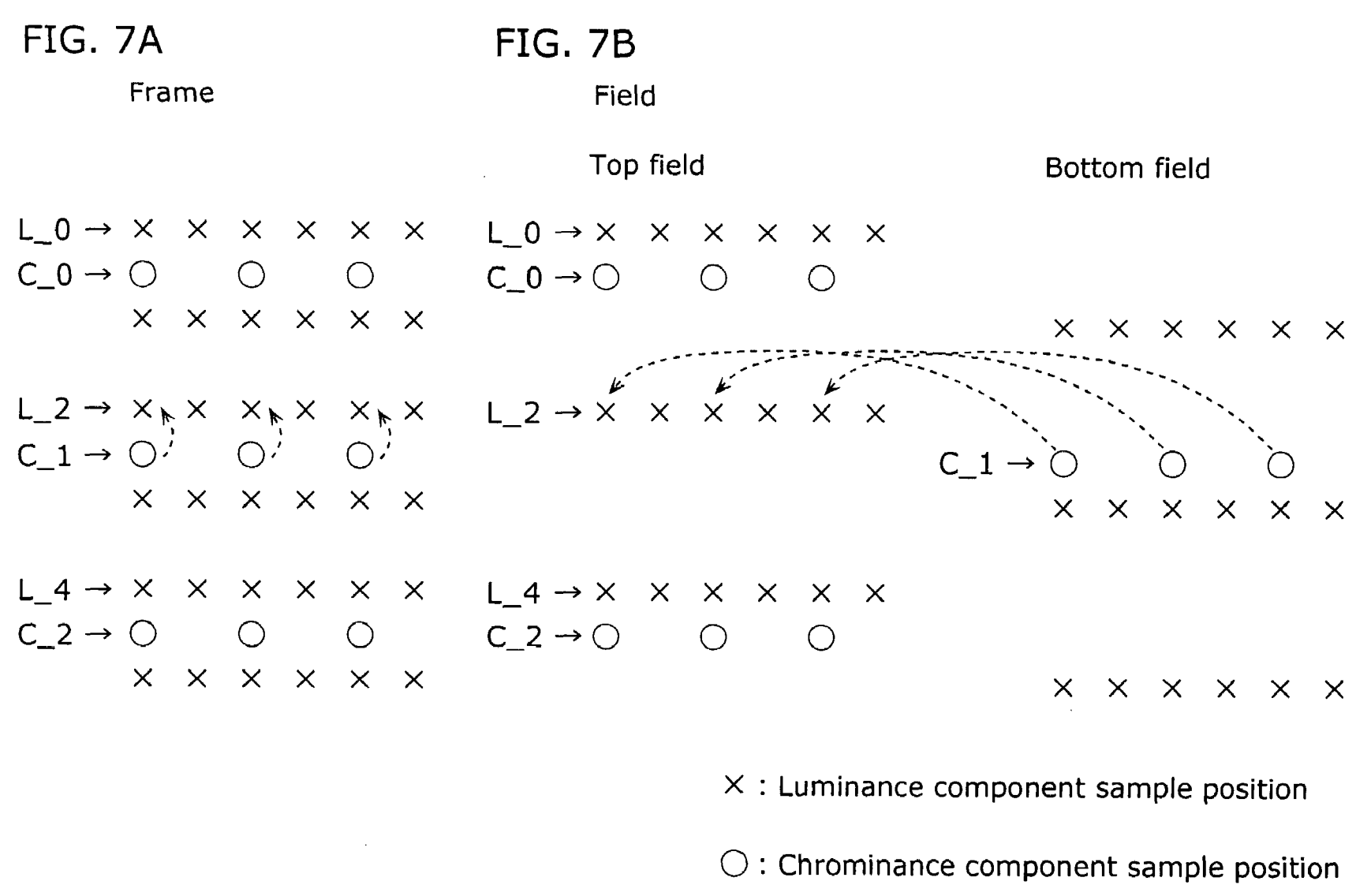

In the conventional method, as explained using FIGS. 7A and 7B, in the case where the deblocking filter is applied to the chrominance components of C_1, it is assumed to refer to the luminance components of L_2 using the equation 1(b). In the deblocking, there is a possibility that a type of applied filter differs for each field in the case where a target block is in a frame structure but the adjacent block is in a field structure. That is, the result largely differs, for the filter to be applied for the chrominance components C_1, depending on whether using the filter used for the luminance components in the top field or using the filter used for the luminance components in the bottom field. Consequently, a gap is generated in a degree of compensation of a pixel value because a filter to be used is different between the luminance components and the chrominance components in the bottom field.

However, by using a conversion method according to the present invention, a same type of deblocking filter is used for the luminance component and the chrominance component which are making up a pixel in the same field. Therefore, it is possible to perform encoding and decoding so as to generate a consistent image when the image is displayed in the interlaced-can form.

Here, instead of using the equations 2(a) and 2(b) for converting the pixel position of a target chrominance component into the pixel position of a corresponding luminance component, the following equations also can be used. Note that, XL indicates a horizontal coordinate value of the luminance; XC indicates a horizontal coordinate value of the chrominance; YL indicates a vertical coordinate value of the luminance; and YC indicates a vertical coordinate value of the chrominance.

$$XL = 2 \times XC \quad \text{(equation 2(a1))}$$

$$YL = 2 \times YC \quad \text{(equation 2(b1))}$$

$$YL = 2 \times YC + 1 \quad \text{(equation 2(b2))}$$

In the case where the chrominance component belongs to the top field, a conversion is performed using the equations 2(a1) and 2(b1), and in the case where the chrominance component belongs to the bottom field, a conversion is performed using the equations 2(a2) and 2(b2).

(2) Half Decimation in a Horizontal Direction

Figure 10A:
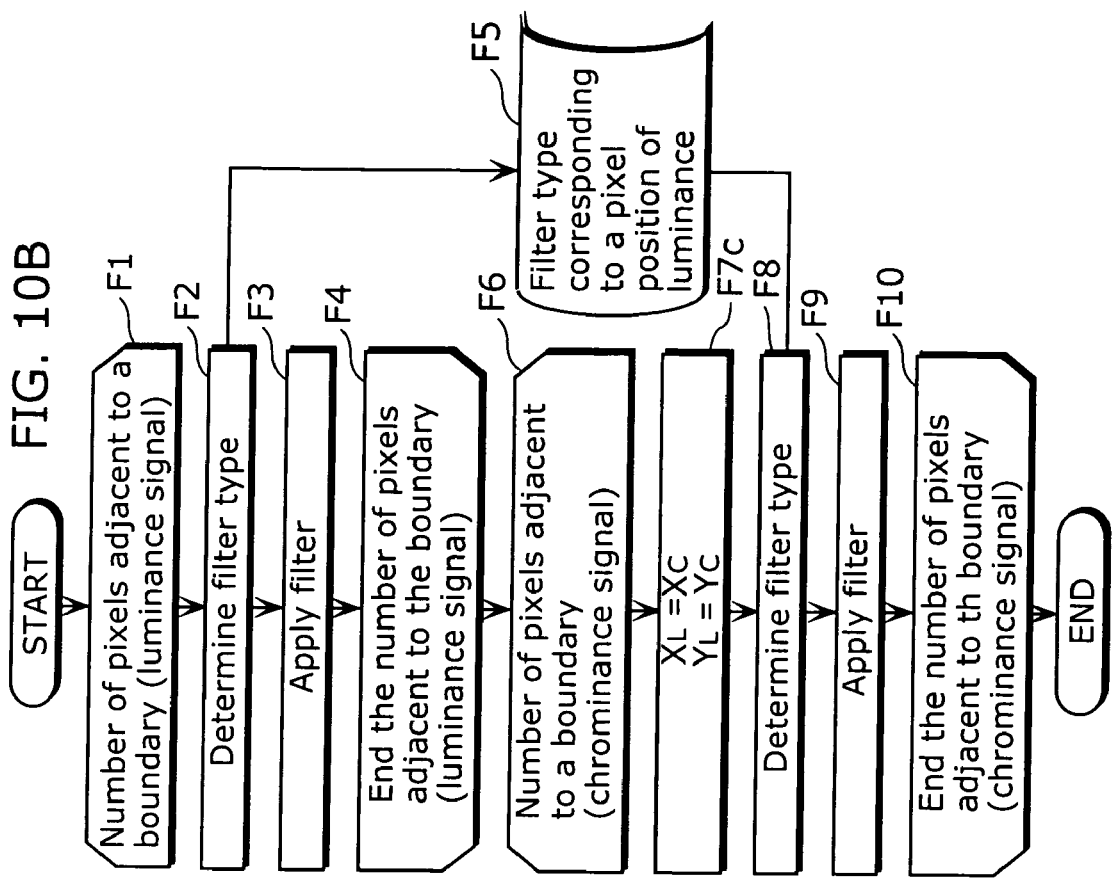
FIGS. 10A and 10B are flowcharts for explaining flows of other deblocking processing in the moving image encoding apparatus and the moving image decoding apparatus in the first embodiment.

FIG. 10A is a flowchart for explaining a flow of deblocking processing in the case where an image in which the chrominance components are decimated to the half amount only in a horizontal direction is inputted. It differs with FIG. 8 only in the deblocking for the chrominance components. Therefore, explanation about the same processing other than that is omitted in here.

In order to perform deblocking on the chrominance components, a loop processing is repeated as many times as the number of pixels of the chrominance components adjacent to the target block boundary (F6 and F10); a type of filter is selected in each loop (F8); and the selected filter is applied (F9). Herein, a filter to be applied to the chrominance component is determined based on a type of filter used for the luminance component. Specifically, the type of filter is used by referring to the type of filter for the corresponding luminance component used at the pixel position from the memory region in which information about the type of filter determined by the processing performed on the luminance component is stored. Herein, the pixel position of the target chrominance component is converted to the pixel position of the corresponding luminance component (F7*b*).

The conversion of information about a position of a pixel is performed so as to have a position of a pixel of a luminance component assigned to a same field as a field assigned to the pixel of the target chrominance component when the target block is replaced to the field structure. Here, the chrominance components are decimated to the half amount only in a horizontal direction. Therefore, the conversion is performed using the following equations. Note that, XL indicates a horizontal coordinate value of the luminance; XC indicates a horizontal coordinate value of the chrominance; YL indicates a vertical coordinate value of the luminance; and YC indicates a vertical coordinate value of the chrominance.

$$XL = 2 \times XC \quad \text{(equation 3(a))}$$

$$YL = YC \quad \text{(equation 3(b))}$$

By applying a filter determined by the processing, the deblocking is performed on the chrominance components. For each block, a boundary made up of a vertical edge on a left side and a boundary made up of a horizontal edge on the upper side are targeted. Therefore, in the case where the luminance component is a block that is, for example, made up of horizontal 4×vertical 4 pixels, the chrominance is horizontal 2×vertical 4 pixels because here explains an example of decimating the chrominance components to the half amount only in the horizontal direction. Consequently, the above processing is repeated six times.

FIGS. 11A and 11B 11 are drawings for explaining a relationship between positions of pixels of target chrominance components and positions of pixels of reference luminance components converted using the equations 3(a) and 3(b). FIG. 11A shows a positional relationship between the luminance components and the chrominance components in the frame structure. FIG. 11B shows a positional relationship between the luminance components and the chrominance components in the case of replacing the image to the field structure. Here, L_0 indicates a position of the luminance components at zeroth line and C_0 indicates a position of the chrominance components at zeroth line. In the case of applying the deblocking filter to the chrominance components of C_1, it is indicated to refer to the L_1 luminance components of L_1 using the equation 3(b). Replacing the pixels herein to the field structure, it is found that the type of filter for the chrominance components of C_1 in the bottom field is determined by referring to the luminance components of L_1 in the same bottom field.

Using the mentioned conversion method, the same type of deblocking filter is applied to the luminance components and the chrominance components which make up a same pixel in the same field. Therefore, it is possible to perform encoding and decoding so as to generate a consistent image when the image is displayed in the interlaced scan form.

(3) No Decimation

Figure 10B:
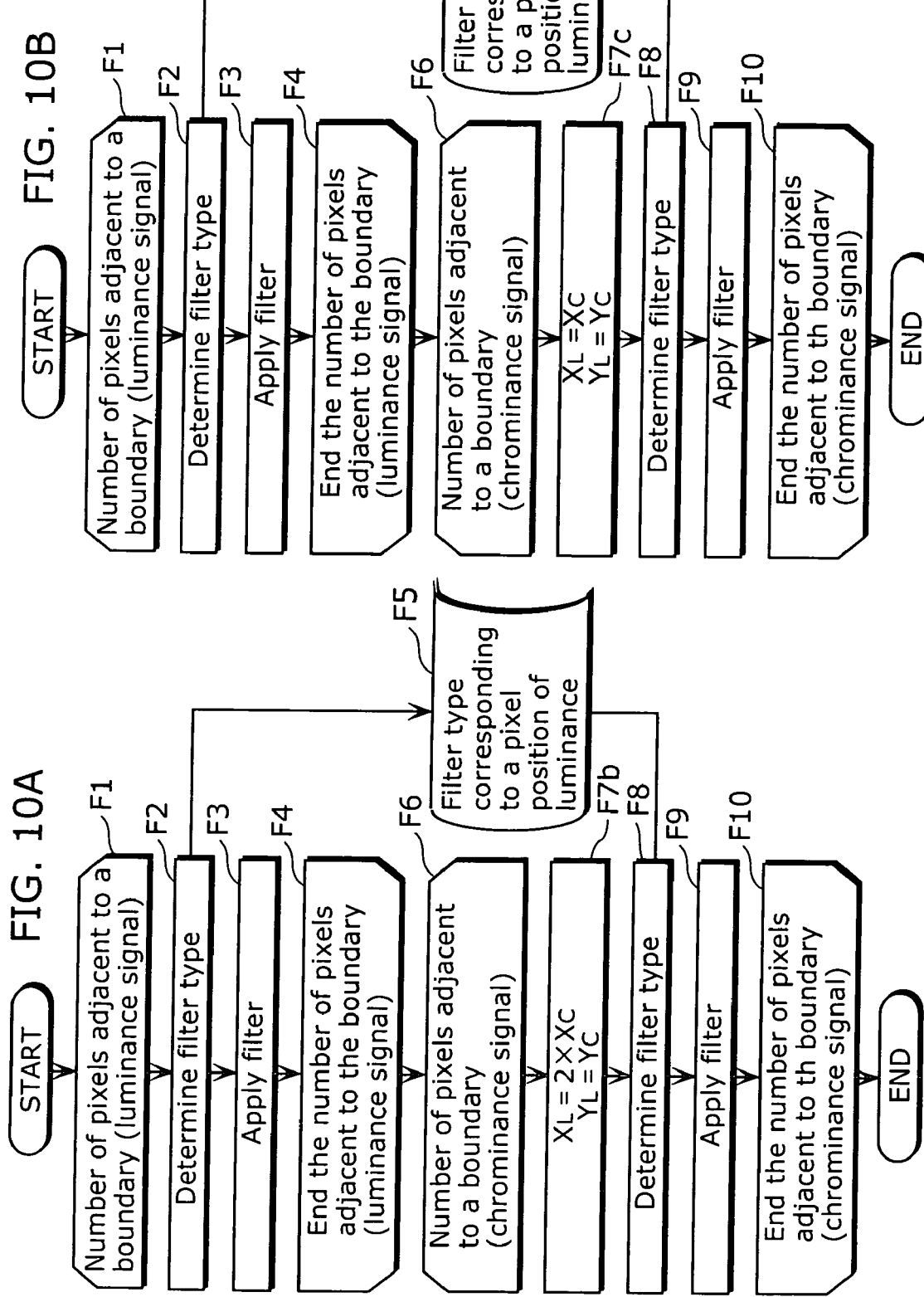

FIG. 10B is a flowchart for explaining a flow of deblocking processing in the case where an image in which chrominance components are not decimated is inputted. It differs with FIG. 8 only in the deblocking performed on the chrominance components. Therefore, explanations about the same processing other than that is omitted in here.

In order to perform deblocking on the chrominance components, a loop processing is repeated as many times as the number of pixels of the chrominance components adjacent to the target block boundary (F6 and F10); a type of filter is selected in each loop (F8); and the selected filter is applied (F9). Herein, a filter to be applied to the chrominance components is determined based on the type of filter used for the luminance components. That is, a type of filter applied at the pixel position of the corresponding luminance component is referred and used from the memory region in which information about types of filters are determined by the processing performed on the luminance component is stored. Herein, the pixel position of the target chrominance component is converted to a pixel position of the corresponding luminance component (F7*c*).

The conversion of information about a position of a pixel is performed so as to have a position of a pixel of a luminance component assigned to the same field as a field assigned to a pixel of the chrominance component to be targeted when the target block is replaced to the field structure. Here, since the chrominance components are not decimated, the conversion is performed using the following equations. Note that, marks indicate the following: XL indicates a horizontal coordinate value of the luminance; XC indicates a horizontal coordinate value of the chrominance; Y L indicates a vertical coordinate value of the luminance; and YC indicates a vertical coordinate value of the chrominance.

$$XL = XC \quad \text{(equation 4(a))}$$

$$YL = YC \quad \text{(equation 4(b))}$$

By applying the filter determined by the mentioned processing, the deblocking is performed on the chrominance components. For each block, a boundary made up of a vertical edge on a left side and a boundary made up of a horizontal edge on the upper side are targeted. Therefore, in the case where the luminance component is a block of, for example, horizontal 4×vertical 4 pixels, the chrominance component is horizontal 4×vertical 4 pixels because it is explained as an example where the chrominance components are not decimated. Consequently, the processing is repeated eight times.

FIGS. 12A and 12B are drawings for explaining a relationship between positions of pixels of target chrominance components and the positions of pixels of reference luminance components that are converted using the equations 4(a) and 4(b). FIG. 12A shows a positional relationship between luminance components and chrominance components in the frame structure. FIG. 12B shows a positional relationship between the luminance components and the chrominance components in the case where the image is replaced to the field structure. Here, L_0 indicates a position of luminance components at zeroth line; and C_0 indicates a position of chrominance components at zeroth line. In the case where the deblocking filter is applied to the color components of C_1, it is indicated to refer the luminance components of L_1 using the equation 4(b). Replacing the pixels herein to the field structure, it is found that the type of filter applied to the chrominance component of C_1 in the bottom field is determined by referring to the luminance component of L_1 in the same bottom field.

Using the mentioned conversion method, the same type of deblocking filter is applied for the luminance components and the chrominance components which make up a same pixel in the same field. Therefore, it is possible to perform encoding and decoding so as to generate a consistent image in the case where the image is displayed in the interlaced-scan form.

Second Embodiment

In addition, by recording a program for realizing the layout of the moving image encoding method or the moving image decoding method as shown in each of the above-mentioned embodiments, on a recording medium such as a flexible disk, it becomes possible to perform the processing as shown in the above embodiment easily in an independent computer system.

Figure 13A:
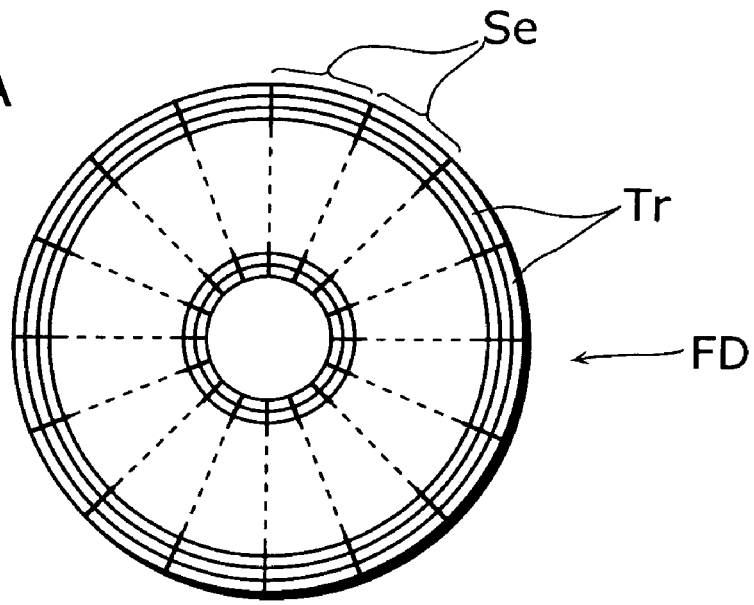
FIGS. 13A-13C are drawings for explaining about a recording medium for storing a program for causing a computer system to execute the moving image encoding method and the moving image decoding method in each embodiment.
Figure 13B:
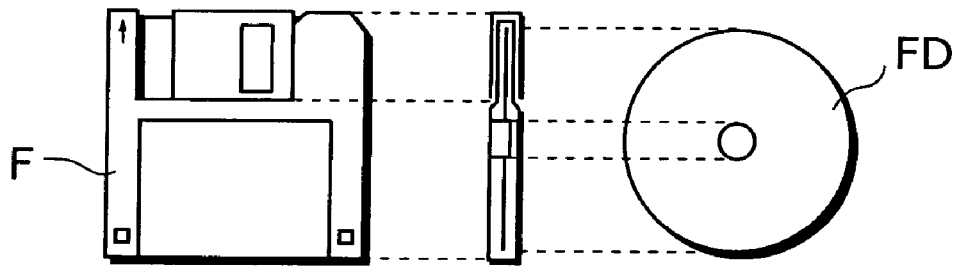
Figure 13C:
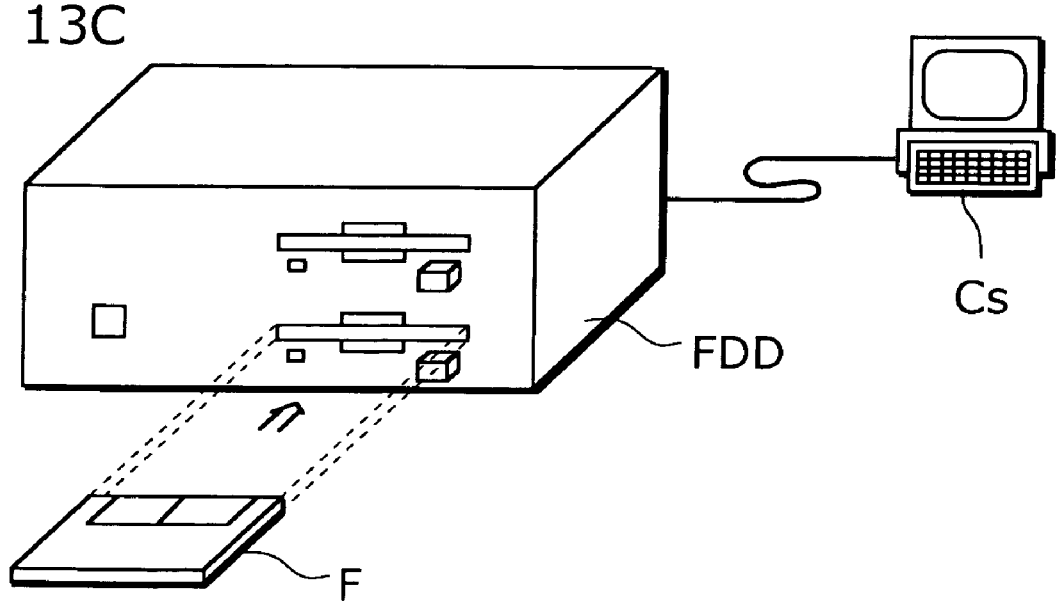

FIGS. 13A-13C are diagrams of a recording medium for recording a program for realizing the moving image encoding method and the moving image decoding method in the above embodiment in the computer system.

FIG. 13B shows the front view of a flexible disk and the schematic cross-section, as well as a flexible disk itself, whereas FIG. 13A shows an example of a physical format of the flexible disk as a recording medium body. A flexible disk FD is contained in a case F, a plurality of tracks Tr are formed concentrically on the surface of the disk in the radius direction from the periphery, and each track is divided into 16 sectors Se in the angular direction. Therefore, in the flexible disk storing the above-mentioned program, the moving image encoding method as the above program is recorded in an area allocated for it on the above flexible disk FD In addition, FIG. 13C shows the configuration for recording and reproducing the program on and from the flexible disk FD. When the program is recorded on the flexible disk FD, the computer system Cs writes in the moving image encoding method and the moving image decoding method as the program on the flexible disk FD via a flexible disk drive. When the above moving image encoding method and the moving image decoding method are constructed in the computer system using the program recorded on the flexible disk, the program is read out from the flexible disk via the flexible disk drive and transferred to the computer system.

Note that the above explanation is made on an assumption that a recording medium is a flexible disk, but the same processing can also be performed using an optical disk. In addition, the recording medium is not limited to these, but any other mediums such as a CD-ROM, memory card, and a ROM cassette can be used in the same manner if a program can be recorded on them.

Further, the applications of the moving image encoding apparatus and the moving image decoding apparatus illustrated in the above embodiments and a system using them shall be explained here.

Figure 14:
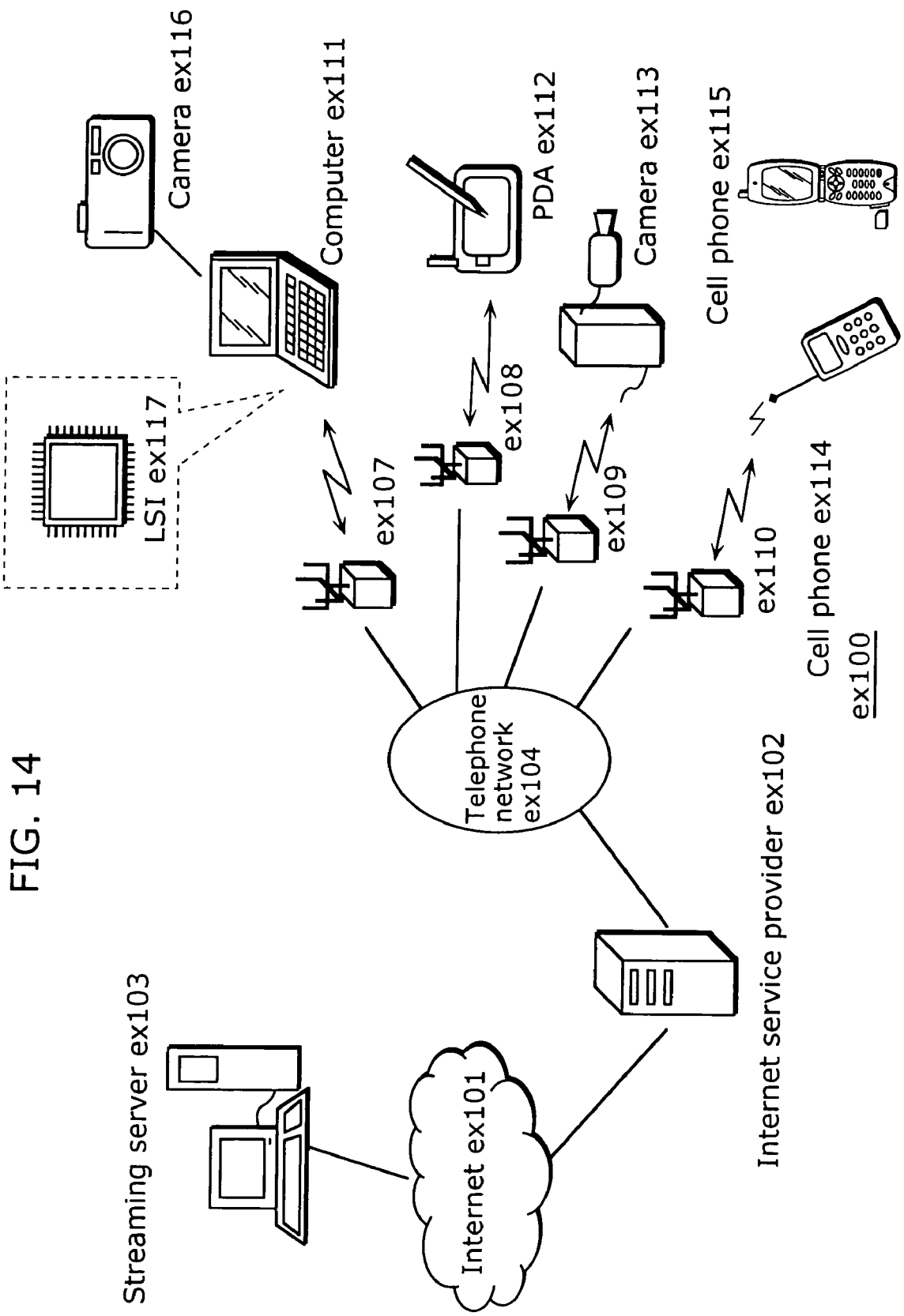
FIG. 14 is a block diagram showing an overall structure of a content supply system for realizing content distribution service.

FIG. 14 is a diagram showing the overall configuration of a content providing system ex100 for realizing content distribution service. The area for providing communication service is divided into cells of desired size, and base stations ex107 to ex110 which are fixed wireless stations are placed in respective cells.

In this content providing system ex100, various devices such as a computer ex111, a personal digital assistant (PDA) ex112, a camera ex113, a cell phone ex114 and a camera-equipped cell phone ex115 are connected to the Internet ex101, via an Internet service provider ex102, a telephone network ex104 and base stations ex107 to ex110, for example.

However, the content providing system ex100 is not limited to the combination as shown in FIG. 14, and may be connected to a combination of any of them. Also, each device may be connected directly to the telephone network ex104, not through the base stations ex107 to ex110 which are the fixed wireless stations.

The camera ex113 is a device such as a digital video camera capable of shooting moving images. The cell phone may be any of a cell phone of a Personal Digital Communications (PDC) system, a Code Division Multiple Access (CDMA) system, a Wideband-Code Division Multiple Access (W-CDMA) system or a Global System for Mobile Communications (GSM) system, a Personal Handy-phone System (PHS) and the like.

Also, a streaming server ex103 is connected to the camera ex113 via the base station ex109 and the telephone network ex104, which realizes live distribution or the like using the camera ex113 based on the encoded data transmitted from the user. The encoding of the data shot by the camera may be performed by the camera ex113, the server for transmitting the data, or the like. Also, the moving image data shot by a camera ex116 may be transmitted to the streaming server ex103 via the computer ex111. The camera ex116 is a device such as a digital camera capable of shooting still and moving images. In this case, either the computer ex111 or the camera ex116 may encode the moving image data. An LSI ex117 included in the computer ex111 or the camera ex116 performs the encoding processing. Note that software for encoding and decoding moving images may be integrated into any type of a recording medium (such as a CD-ROM, a flexible disk and a hard disk) that is readable by the computer ex111 or the like. Furthermore, the camera-equipped cell phone ex115 may transmit the moving image data. This moving image data is the data encoded by the LSI included in the cell phone ex115.

In this content providing system ex100, contents (such as a video of a live music performance) shot by users using the camera ex113, the camera ex116 or the like are encoded in the same manner as in the above embodiments and transmitted to the streaming server ex103, while the streaming server ex103 makes stream distribution of the above content data to the clients at their request. The clients include the computer ex111, the PDA ex112, the camera ex113, the cell phone ex114, and the like, capable of decoding the above-mentioned encoded data. The content providing system ex100 is a system in which the clients can thus receive and reproduce the encoded data, and further can receive, decode and reproduce the data in real time so as to realize personal broadcasting.

When each apparatus in this system performs encoding or decoding, the moving image encoding apparatus or the moving image decoding apparatus shown in each of the above-mentioned embodiments may be used.

A cell phone is now explained as an example thereof.

Figure 15:
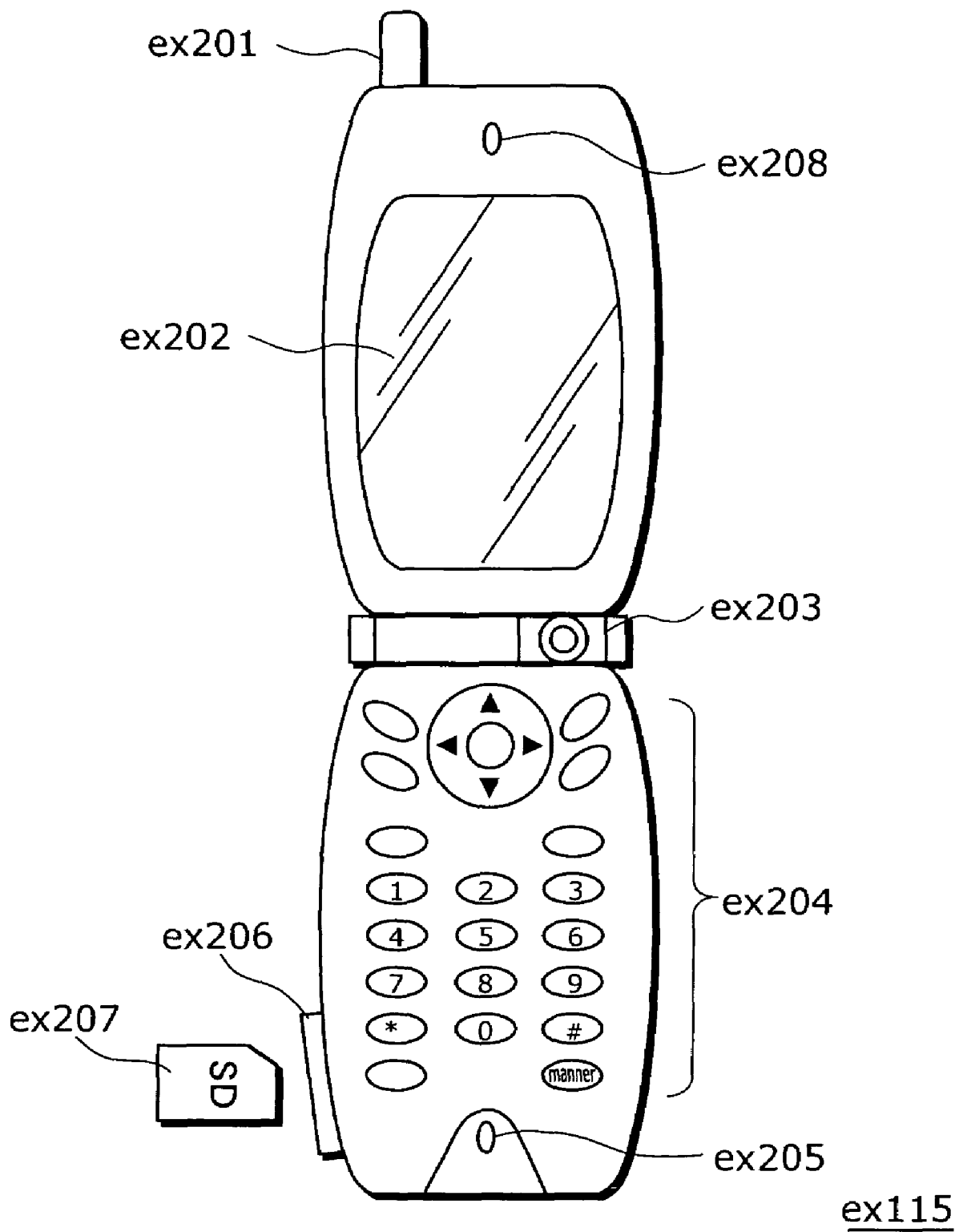
FIG. 15 is a schematic diagram showing an example of a cell phone.

FIG. 15 is a diagram showing a cell phone ex115 which uses the moving image encoding method and the moving image decoding method as explained in the above embodiments. The cell phone ex115 has an antenna ex201 for communicating radio waves with the base station ex110, a camera unit ex203 such as a CCD camera capable of shooting moving and still images, a display unit ex202 such as a liquid crystal display for displaying the data obtained by decoding video shot by the camera unit ex203, video received by the antenna ex201, or the like, a main body including a set of operation keys ex204, a voice output unit ex208 such as a speaker for outputting voices, a voice input unit ex205 such as a microphone for inputting voices, a recording medium ex207 for storing encoded or decoded data, such as data of moving or still images shot by the camera, and data of text, moving images or still images of received e-mails, and a slot unit ex206 for attaching the recording medium ex207 into the cell phone ex115. The recording medium ex207 includes a flash memory element, a kind of Electrically Erasable and Programmable Read Only Memory (EEPROM) that is an electrically rewritable and erasable nonvolatile memory, in a plastic case such as an SD card.

Further, the cell phone ex115 is explained with reference to FIG. 16. In the cell phone ex115, a power supply circuit unit ex310, an operation input control unit ex304, an image encoding unit ex312, a camera interface unit ex303, an Liquid Crystal Display (LCD) control unit ex302, an image decoding unit ex309, a multiplex/demultiplex unit ex308, a record/reproduce unit ex307, a modem circuit unit ex306 and a voice processing unit ex305, are connected to a main control unit ex311, and to each other, via a synchronous bus ex313. The main control unit ex311 is for the overall controlling of each unit of the main body including the display unit ex202 and the operation keys ex204.

When a call-end key or a power key is turned ON by a user's operation, the power supply circuit unit ex310 supplies the respective units with power from a battery pack so as to activate the camera-equipped digital cell phone ex115 to a ready state.

In the cell phone ex115, under the control of the main control unit ex311 including a CPU, ROM, RAM and the like, the voice processing unit ex305 converts the voice signals received by the voice input unit ex205 in conversation mode into digital voice data, the modem circuit unit ex306 performs spread spectrum processing of the digital voice data, and the communication circuit unit ex301 performs digital-to-analog conversion and frequency transformation of the data, so as to transmit the result via the antenna ex201. Also, in the cell phone ex115, the communication circuit unit amplifies the data received by the antenna ex201 in conversation mode and performs the frequency transformation and an analog-to-digital conversion; the modem circuit unit ex306 performs inverse spread spectrum processing of the data; and the voice processing unit ex305 converts it into analog voice data, so as to output the result via the voice output unit ex208.

Furthermore, when transmitting an e-mail in data communication mode, the text data of the e-mail inputted by operating the operation keys ex204 of the main body is sent out to the main control unit ex311 via the operation input control unit ex304. In the main control unit ex311, after the modem circuit unit ex306 performs spread spectrum processing of the text data and the communication circuit unit ex301 performs a digital-to-analog conversion and frequency transformation for the text data, the data is transmitted to the base station ex110 via the antenna ex201.

When image data is transmitted in data communication mode, the image data shot by the camera unit ex203 is provided to the image encoding unit ex312 via the camera interface unit ex303. When the image data is not transmitted, the image data shot by the camera unit ex203 can also be displayed directly on the display unit 202 via the camera interface unit ex303 and the LCD control unit ex302.

The image encoding unit ex312, including the moving image encoding apparatus explained in the present invention, compresses and encodes the image data provided from the camera unit ex203 by the encoding method used for the moving image encoding apparatus as shown in the above-mentioned embodiments so as to transform it into encoded image data, and sends it out to the multiplex/demultiplex unit ex308. At this time, the cell phone ex115 sends out the voices received by the voice input unit ex205 during the shooting by the camera unit ex203, to the multiplex/demultiplex unit ex308 as digital voice data via the voice processing unit ex305.

The multiplex/demultiplex unit ex308 multiplexes the encoded image data provided from the image encoding unit ex312 and the voice data provided from the voice processing unit ex305 using a predetermined method, and the modem circuit unit ex306 then performs spread spectrum processing of the multiplexed data obtained as the result, and the communication circuit unit ex301 performs digital-to-analog conversion and frequency transformation on the result, for the transmission via the antenna ex201.

As for receiving data of a moving image file which is linked to a website or the like in data communication mode, the modem circuit unit ex306 performs inverse spread spectrum processing of the data received from the base station ex110 via the antenna ex201, and sends out the multiplexed data obtained as the result to the multiplex/demultiplex unit ex308.

In order to decode the multiplexed data received via the antenna ex201, the multiplex/demultiplex unit ex308 demultiplexes the multiplexed data into an encoded bit stream of image data and an encoded bit stream of voice data, and provides the encoded image data to the image decoding unit ex309 and the voice data to the voice processing unit ex305, respectively via the synchronous bus ex313.

Next, the image decoding unit ex309, including the moving image decoding apparatus explained in the present invention, decodes the encoded bit stream of the image data using the decoding method corresponding to the encoding method as shown in the above-mentioned embodiments, so as to generate reproduced moving image data, and provides this data to the display unit ex202 via the LCD control unit ex302, and thus moving image data included in a moving image file linked to a website, for instance, is displayed. At the same time, the voice processing unit ex305 converts the voice data into analog voice data, and provides this data to the voice output unit ex208, and thus voice data included in the moving image file linked to a website, for instance, is reproduced.

Figure 17:
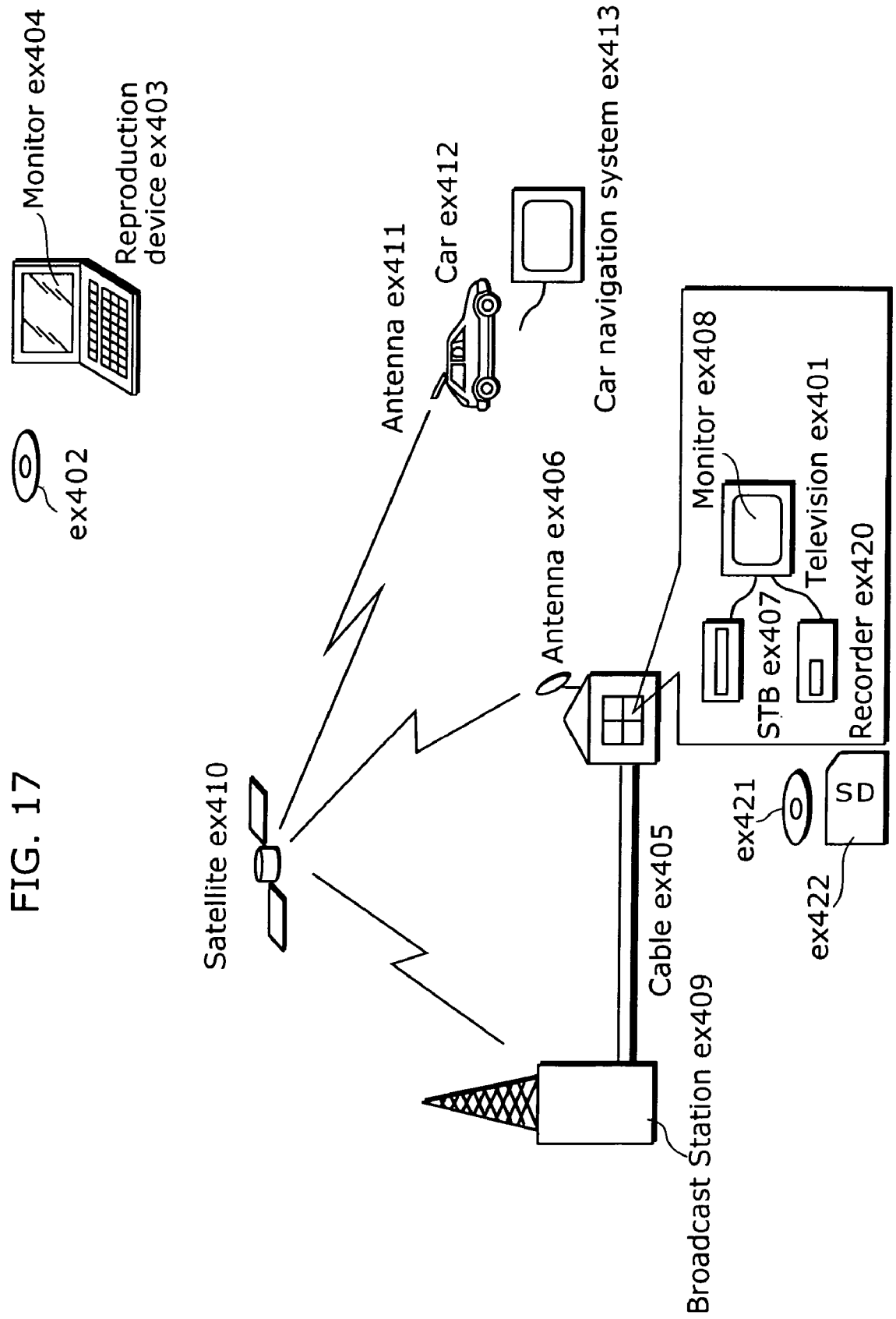
FIG. 17 is a block diagram showing an overall structure of a system for digital broadcast.

The present invention is not limited to the above-mentioned system since satellite or ground-based digital broadcasting has been in the news lately, and at least either the moving image encoding apparatus or the moving image decoding apparatus in the above-mentioned embodiments can be incorporated into a digital broadcasting system as shown in FIG. 17. More specifically, an encoded bit stream of video information is transmitted from a broadcast station ex409 to a communication or broadcast satellite ex410 via radio waves. Upon receipt of it, the broadcast satellite ex410 transmits radio waves for broadcasting, a home antenna ex406 with a satellite broadcast reception function receives the radio waves, and an apparatus such as a television (receiver) ex401 or a Set Top Box (STB) ex407 decodes the encoded bit stream for reconstruction. The moving image decoding apparatus as shown in the above-mentioned embodiments can be implemented in a reproduction device ex403 for reading and decoding an encoded bit stream recorded on a storage medium ex402 such as a CD and DVD that is a recording medium. In this case, the reproduced video signals are displayed on a monitor ex404. It is also conceived to implement the moving image decoding apparatus in the set top box ex407 connected to a cable ex405 for cable television or the antenna ex406 for satellite and/or ground-based broadcasting so as to reproduce them on a monitor ex408 of the television. The moving image decoding apparatus may be incorporated into the television, not in the set top box. Also, a car ex412 having an antenna ex411 which can receive signals from the satellite ex410, the base station ex107 or the like, for reproducing moving images on a display device such as a car navigation system ex413 or the like in the car ex412.

Furthermore, the moving image encoding apparatus as shown in the above-mentioned embodiments can encode image signals and record them on a recording medium. As a concrete example, there is a recorder ex420 such as a DVD recorder for recording image signals on a DVD disk ex421 and a disk recorder for recording them on a hard disk. They can also be recorded on an SD card ex422. If the recorder ex420 includes the moving image decoding apparatus as shown in the above-mentioned embodiments, the image signals recorded on the DVD disk ex421 or the SD card ex422 can be reproduced for display on the monitor ex408.

Figure 16:
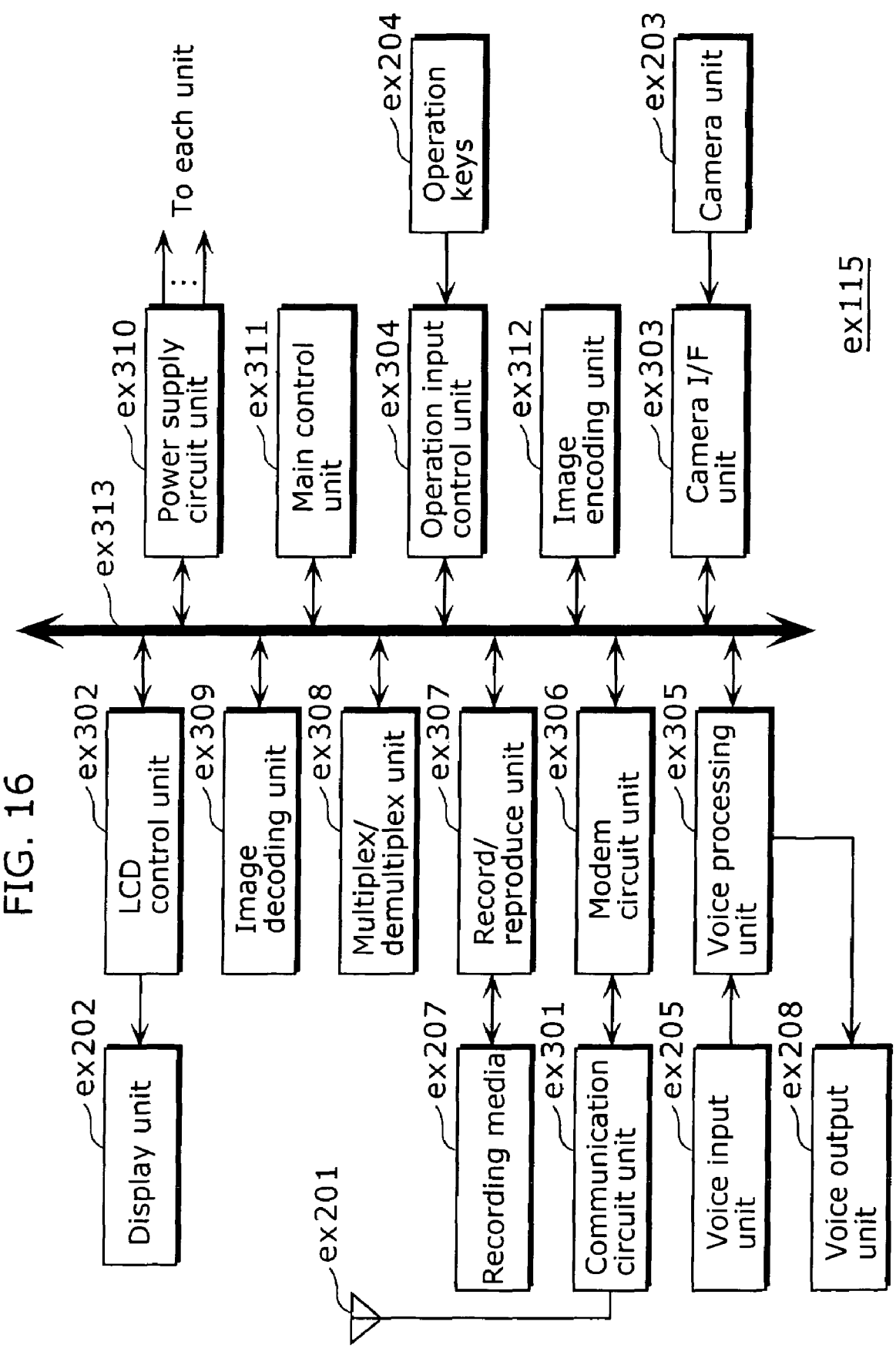
FIG. 16 is a block drawing showing an internal structure of the cell phone.

As for the configuration of the car navigation system ex413, the configuration without the camera unit ex203, the camera interface unit ex303 and the image encoding unit ex312, out of the units as shown in FIG. 16, is conceivable. The same applies to the computer ex111, the television (receiver) ex401 and others.

Moreover, three types of implementations can be conceived for a terminal such as the above-mentioned cell phone ex114; a communication terminal equipped with both an encoder and a decoder, a sending terminal equipped with an encoder only, and a receiving terminal equipped with a decoder only.

As described above, it is possible to use the moving image encoding method or the moving image decoding method described in the above embodiments in any of above-mentioned devices and systems, and thus the effects explained in the above embodiments can be obtained.

Also, the present invention is not limited to the above mentioned embodiments so that various modifications and corrections can be made within the scope of the present invention.

Figure 2:
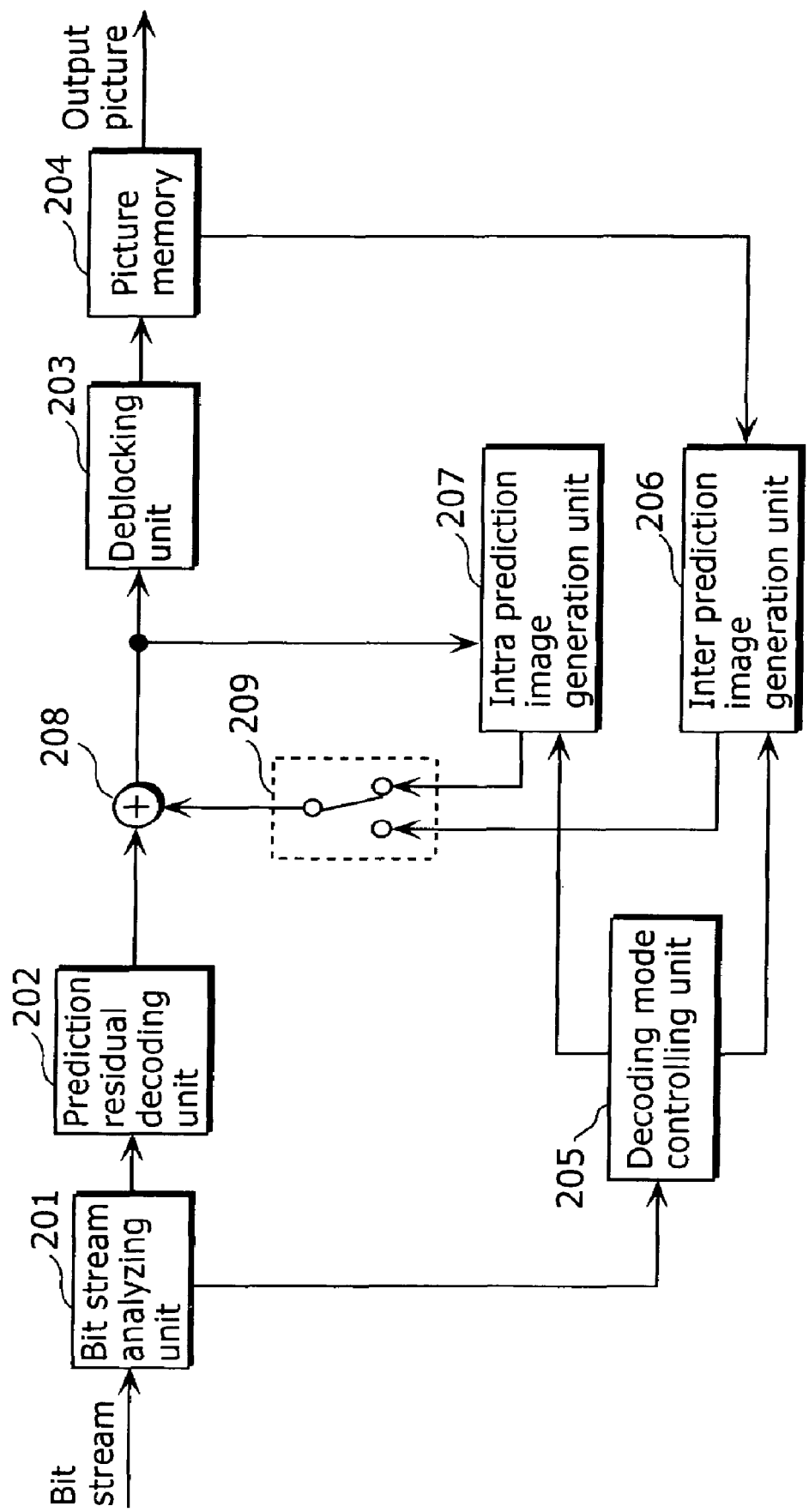
FIG. 2 is a block diagram showing a structure of a conventional moving image decoding apparatus.
Figure 4:
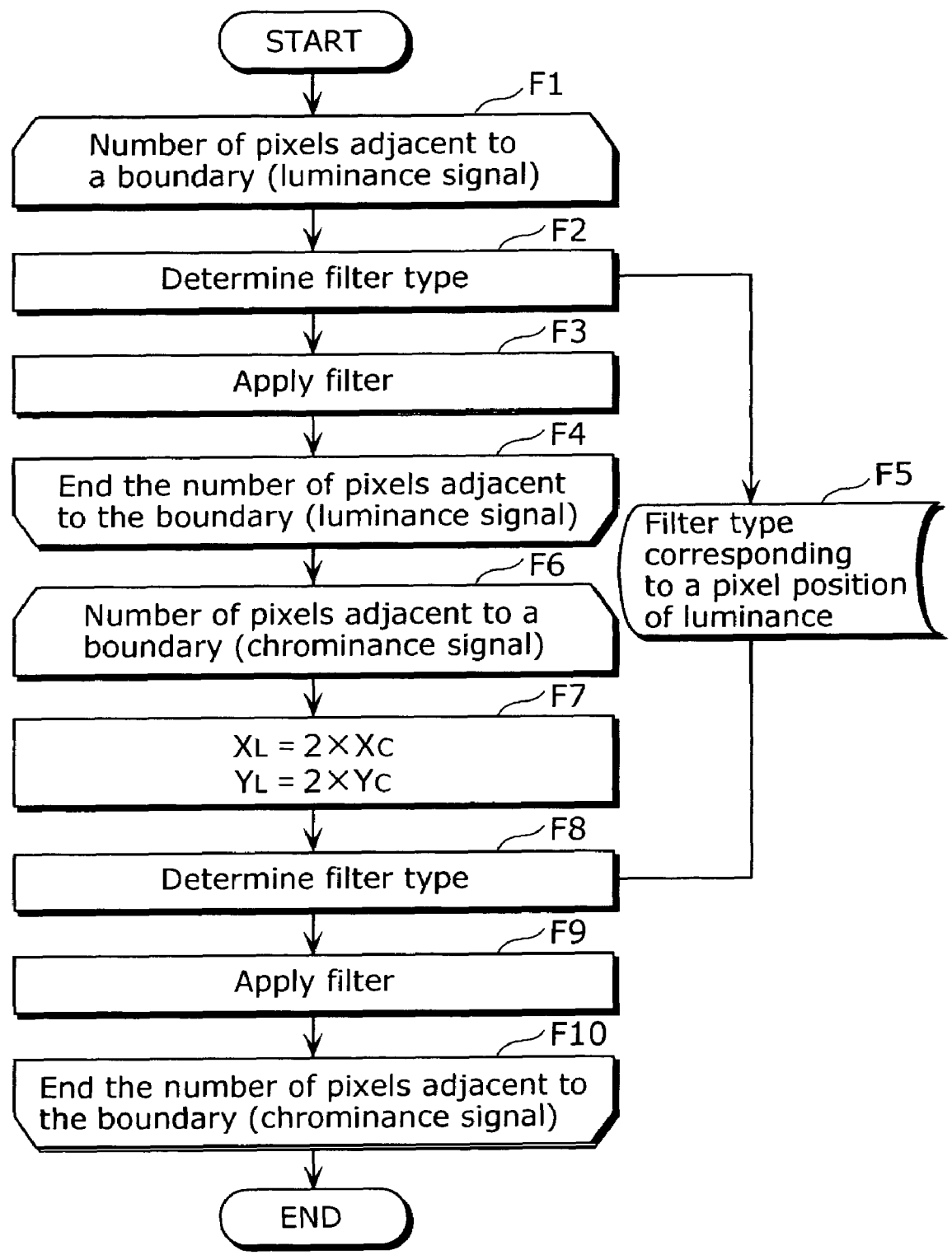
FIG. 4 is a flowchart for explaining a flow of deblocking processing in the conventional moving image encoding apparatus and the moving image decoding apparatus.

Further, each functional block shown in the block diagrams FIG. 1 and FIG. 2 is typically realized as a LSI which is an integrated. circuit. This LSI may be constructed in one chip or in a plural chips (for example, a functional block other than memory may be constructed in one chip.) Here, it is called as LSI. However, it can be called as an IC, a system LSI, a super LSI, or an ultra LSI depending on an integration density.

In addition, a method of constructing an integrated circuit is not limited to the LSI so that it may be realized as a private circuit or as a general processor. After the LSI is manufactured, a Field Programmable Gate Array (FPGA) capable of programming, and a reconfigurable processor which is can reconfigure connection and setting of circuit cells in the LSI may be used.

Furthermore, there is no doubt that, if a technology of constructing an integrated circuit is introduced as a replace of the LSI by a development of semiconductor technology or a derived another technology, the functional block may be integrated using the new technology. There is a possibility to apply a biotechnology and the like.

INDUSTRIAL APPLICABILITY

As described in the above, a moving image encoding method and a moving image decoding method according to the present invention are useful as methods for encoding each picture which makes up an inputted image, outputs as a moving image encoded data, and decode the moving image encoded data, using, for example, a cell phone, a DVD apparatus, a personal computer and the like.

The invention claimed is:

1. A moving image encoding method for encoding an inputted picture on a block-by-block basis after dividing the picture into blocks, the picture including luminance components and chrominance components, said method comprising:

a prediction encoding step of encoding the picture, using a prediction encoding unit, by referring to an encoded area in the picture or a different encoded picture;

a reconstructed picture generation step of reconstructing the picture, using a reconstructed picture generation unit, and using encoded data generated in said prediction encoding step; and a deblocking step of reducing distortion using a deblocking unit, by filtering a boundary between blocks of the reconstructed picture generated in said reconstructed picture generation step, wherein in said deblocking step, filters are respectively applied to the luminance components and the chrominance components: a type of the filters is selected based on encoding information of each luminance components, and the selected filter is applied to the luminance component; and a filter selected for a luminance component, which belongs to a same field as a chrominance component and corresponds to the chrominance component, is applied to the chrominance component.

2. The moving image encoding method according to claim 1, wherein in said deblocking step, strength of the filters differs depending on a type of the filters.

3. The moving image encoding method according to claim 1, wherein in said deblocking step, in the case where chrominance components of a picture to be encoded are decimated to a half amount in a direction vertical to luminance components, a vertical position of a pixel of a luminance component is determined based on a pixel structure that results from dividing the picture into spaces of a top field and a bottom field even in the case where the picture is encoded on a frame-by-frame basis, the pixel of the luminance component being referred to for determining a type of a filter to be applied to the chrominance component.

4. The moving image encoding method according to claim 1, wherein in said deblocking step, in the case where chrominance components of a picture to be encoded are not decimated in a direction vertical to luminance components, a vertical position of a pixel of a luminance component is determined as a position same as a vertical position of the chrominance component, the pixel of the luminance component being referred to for determining a type of a filter to be applied to the chrominance component.

5. A moving image decoding method for decoding encoded moving image data obtained by encoding, on a block-by-block basis, a picture which is divided into blocks, the picture including luminance components and chrominance components, said method comprising:

a prediction decoding step of decoding the picture, using a prediction decoding unit, by referring to a decoded area in the picture or a different decoded picture; and a deblocking step of reducing distortion, using a deblocking unit, by filtering a boundary between blocks of the decoded picture generated in said prediction decoding step, wherein in said deblocking step, filters are respectively applied to the luminance components and the chrominance components: a type of the filters is selected based on encoding information of the luminance component, and the selected filter is applied to each luminance component; and a filter selected for a luminance component, which belongs to a same field as a chrominance component and corresponds to the chrominance component, is applied to the chrominance component.

6. The moving image decoding method according to claim 5, wherein in said deblocking step, strength of the filters differs depending on a type of the filters.

7. The moving image decoding method according to claim 5, wherein in said deblocking step, in the case where encoded moving image data to be decoded is obtained by encoding of a picture from which chrominance components are decimated to a half amount in a direction vertical to the luminance components, a vertical position of a pixel of a luminance component is determined based on a pixel structure that results from dividing the picture into spaces of a top field and a bottom field even in the case where the picture is decoded on a frame-by-frame basis, the pixel of the luminance component being referred to for determining a type of a filter to be applied to the chrominance component.

8. The moving image decoding method according to claim 5, wherein in said deblocking step, in the case where encoded moving image data to be decoded is obtained by encoding of a picture from which chrominance components are not decimated in a direction vertical to the luminance components, a vertical position of a pixel of a luminance component is determined as a position same as a vertical position of the chrominance component, the pixel of the luminance component being referred to for determining a type of a filter to be applied to the chrominance component.

9. A moving image encoding apparatus which encodes an inputted picture on a block-by-block basis after dividing the picture into blocks, the picture including luminance components and chrominance components, said apparatus comprising:
a prediction encoding unit operable to encode the picture by referring to an encoded area in the picture or a different encoded picture;
a reconstructed picture generation unit operable to reconstruct the picture using encoded data generated by said prediction encoding unit; and
a deblocking unit operable to reduce distortion by filtering a boundary between blocks of the reconstructed picture generated by said reconstructed picture generation unit,
wherein said deblocking unit is operable to apply respective filters to the luminance components and the chrominance components: a type of the filters is selected based on encoding information of each luminance component and the selected filter is applied to the luminance component; and a filter selected for a luminance component, which belongs to a same field as the chrominance component and corresponds to the chrominance component, is applied to the chrominance component.

10. A moving image decoding apparatus which decodes an encoded moving image data obtained by encoding, on a block-by-block basis, a picture which is divided into blocks, the picture including luminance components and chrominance components, said apparatus comprising:
a prediction decoding unit operable to decode the picture by referring to a decoded area in the picture or a different decoded picture; and
a deblocking unit operable to reduce distortion by filtering a boundary between blocks of the decoded picture generated by said prediction decoding unit,
wherein said deblocking unit is operable to apply respective filters to the luminance components and the chrominance components: a type of the filters is selected based on encoding information of the luminance component of each luminance component, and the selected filter is applied to the luminance component; and a filter selected for a luminance component, which belongs to a same field as the chrominance component and corresponds to the chrominance component, is applied to the chrominance component.

11. A program embodied on a computer-readable medium, the progam being for encoding a picture on a block-by-block basis after dividing the picture into blocks, the picture including luminance components and chrominance components, said program causing a computer to execute:
a prediction encoding step of encoding the picture, using a prediction encoding unit, by referring to an encoded area in the picture or a different encoded picture;
a reconstructed picture generation step of reconstructing the picture, using a reconstructed picture generation unit, and using encoded data generated in said prediction encoding step; and
a deblocking step of reducing distortion, using a deblocking unit, by filtering a boundary between blocks of the reconstructed picture generated in said reconstructed picture generation step,
wherein in said deblocking step, filters are respectively applied to the luminance components and the chrominance components: a type of the filters is selected based on encoding information of each luminance component, and the selected filter is applied to the luminance component; and a filter selected for a luminance component, which belongs to a same field as a chrominance component and corresponds to the chrominance component, is applied to the chrominance component.

12. A program embodied on a computer-readable medium, the program being for decoding an encoded moving image data obtained by encoding of a picture on a block-by-block basis after the picture is divided into blocks, the picture including luminance components and chrominance components, said program causing a computer to execute:
a prediction decoding step of decoding the picture using a prediction decoding unit, by referring to a decoded area in the picture or a different decoded picture; and
a deblocking step of reducing distortion, using a deblocking unit, by filtering a boundary between blocks of the decoded picture generated in said prediction decoding step,
wherein in said deblocking step, filters are respectively applied to the luminance components and the chrominance components: a type of the filters is selected based on encoding information of the luminance components, and the selected filter is applied to each luminance component; and a filter selected for a luminance component, which belongs to a same field as a chrominance component and corresponds to the chrominance component, is applied to the chrominance component.

13. An integrated circuit in which an inputted picture is encoded on a block-by-block basis after being divided into blocks, the picture including luminance components and chrominance components, said integrated circuit comprising:
a prediction encoding unit operable to encode the picture by referring to an encoded area in the picture or a different encoded picture;
a reconstructed picture generation unit operable to reconstruct the picture using encoded data generated by said prediction encoding unit; and a deblocking unit operable to reduce distortion by filtering a boundary between blocks of the reconstructed picture generated by said reconstructed picture generation unit, wherein said deblocking unit is operable to apply respective filters to the luminance components and the chrominance components: a type of the filters is selected based on encoding information of each luminance component and the selected filter is applied to the luminance component; and a filter selected for a luminance component, which belongs to a same field as the chrominance component and corresponds to the chrominance component, is applied to the chrominance component.

14. An integrated circuit in which an encoded moving image data is decoded, the encoded moving image data being obtained by encoding of a picture on a block-by-block basis after the picture is divided into blocks, and the picture including luminance components and chrominance components, said integrated circuit comprising:

a prediction decoding unit operable to decode the picture by referring to a decoded area in the picture or a different decoded picture; and a deblocking unit operable to reduce distortion by filtering a boundary between blocks of the decoded picture generated by said prediction decoding unit, wherein said deblocking unit is operable to apply respective filters to the luminance components and the chrominance components: a type of the filters is selected based on encoding information of the luminance component of each luminance component, and the selected filter is applied to the luminance component; and a filter selected for a luminance component, which belongs to a same field as the chrominance component and corresponds to the chrominance component, is applied to the chrominance component.

* * * * *